US011894019B2

(12) United States Patent
Danila et al.

(10) Patent No.: US 11,894,019 B2
(45) Date of Patent: Feb. 6, 2024

(54) TIME-LAPSE

(71) Applicant: Linearity GmbH, Karlsruhe (DE)

(72) Inventors: Vladimir Danila, Karlsruhe (DE); Paulo Mattos, Karlsruhe (DE); Ralph Theodori, Karlsruhe (DE); Pavlo Pedai, Karlsruhe (DE); Igor Viveiros, Karlsruhe (DE)

(73) Assignee: LINEARITY GMBH, Karlsruhe (DE)

( * ) Notice: Subject to any disclaimer, the term of this patent is extended or adjusted under 35 U.S.C. 154(b) by 0 days.

(21) Appl. No.: 17/138,293

(22) Filed: Dec. 30, 2020

(65) Prior Publication Data
US 2022/0208229 A1 Jun. 30, 2022

(51) Int. Cl.
*G11B 27/00* (2006.01)
*G06F 3/04847* (2022.01)
*G06F 3/0488* (2022.01)

(52) U.S. Cl.
CPC .......... *G11B 27/005* (2013.01); *G06F 3/0488* (2013.01); *G06F 3/04847* (2013.01)

(58) Field of Classification Search
CPC ............ H04L 67/1097; H04L 67/1095; G06F 40/197; G06F 40/166; G06F 16/176; G06F 40/123; G06F 3/0488; G06F 3/04812; G06F 2203/048; G06F 3/0482; G06F 3/0484; G06F 3/0485; G06F 9/453; G06F 11/3414; G06F 3/04847; G16H 50/70; G05B 2219/23423; G11B 27/005
See application file for complete search history.

(56) References Cited

U.S. PATENT DOCUMENTS

| | | | | |
|---|---|---|---|---|
| 5,918,222 A | * | 6/1999 | Fukui | G06Q 10/10 |
| 10,884,694 B1 | * | 1/2021 | Moy | G06F 3/0482 |
| 2007/0088729 A1 | * | 4/2007 | Baca | G06F 9/451 |
| 2008/0250314 A1 | * | 10/2008 | Larsen | G06F 30/00 |
| | | | | 715/705 |
| 2010/0293190 A1 | * | 11/2010 | Kaiser | H04N 21/854 |
| | | | | 707/769 |
| 2011/0055702 A1 | | 3/2011 | Jakobson | |
| 2011/0252301 A1 | | 10/2011 | Vollmer et al. | |

(Continued)

FOREIGN PATENT DOCUMENTS

| | | | | |
|---|---|---|---|---|
| BR | 102014004200 A2 | * | 5/2015 | G06Q 50/22 |
| CA | 2611702 A1 | * | 12/2006 | G06F 16/40 |

(Continued)

OTHER PUBLICATIONS

International Search Report and Written Opinion on the Patentability of Application No. PCT/IB2021/061601 dated Mar. 7, 2022, 17 pages.

(Continued)

*Primary Examiner* — Steven P Sax
(74) *Attorney, Agent, or Firm* — Womble Bond Dickinson (US) LLP

(57) ABSTRACT

A method and apparatus for generating a time-lapse video are disclosed. In one embodiment, the method comprises: storing each instruction that is executed by a vector graphics application to create artwork on a display of a computer system during one or more editing sessions as part of an undo history; and generating a time-lapse video using the undo history.

20 Claims, 28 Drawing Sheets

(56) References Cited

U.S. PATENT DOCUMENTS

| | | | | |
|---|---|---|---|---|
| 2012/0271867 A1* | 10/2012 | Grossman | ............... | G06F 16/93 707/821 |
| 2012/0272153 A1* | 10/2012 | Grossman | ............. | G06F 40/169 715/720 |
| 2013/0305151 A1 | 11/2013 | Muser | | |
| 2014/0080601 A1* | 3/2014 | Knutsson | ................ | A63F 13/00 463/31 |
| 2014/0267380 A1* | 9/2014 | Letts | ........................ | G06T 11/60 345/619 |
| 2016/0259497 A1* | 9/2016 | Foss | ......................... | H04L 67/32 |
| 2017/0185574 A1* | 6/2017 | Fern | ........................ | G06F 9/453 |
| 2017/0192952 A1* | 7/2017 | Lehmann | ............ | G06F 11/3438 |
| 2017/0357544 A1* | 12/2017 | Adler | .................. | G06F 11/0778 |
| 2018/0293766 A1 | 10/2018 | Carlos | | |
| 2019/0243873 A1* | 8/2019 | Kabaghe | ............ | G06F 16/24573 |
| 2020/0012656 A1* | 1/2020 | Pugh | ...................... | G06F 16/248 |
| 2020/0304880 A1* | 9/2020 | Diaz Delgado | ......... | G06F 9/451 |
| 2020/0320763 A1* | 10/2020 | Rodgers | .................. | G06T 11/80 |
| 2020/0380205 A1* | 12/2020 | Chegini | ................ | G06F 40/197 |
| 2021/0133253 A1* | 5/2021 | Underwood | ........ | H04L 67/1097 |
| 2021/0142479 A1* | 5/2021 | Phogat | ................... | G06T 11/206 |
| 2021/0295527 A1* | 9/2021 | Shin | .......................... | G06T 7/12 |
| 2022/0058394 A1* | 2/2022 | Tang | ................. | G08B 13/19673 |
| 2022/0092141 A1* | 3/2022 | Nagar | ..................... | H04L 67/22 |
| 2022/0103565 A1* | 3/2022 | Gilbert | ................... | H04L 63/102 |
| 2022/0191580 A1* | 6/2022 | Yu | ....................... | H04N 21/4854 |

FOREIGN PATENT DOCUMENTS

| | | | | |
|---|---|---|---|---|
| CA | 2698052 A1 | * | 9/2010 | ............. G06F 16/54 |
| CN | 104238865 A | * | 12/2014 | |
| CN | 110389796 A | * | 10/2019 | ............. G06F 16/71 |
| EP | 3015144 A1 | * | 5/2016 | ............. A63F 13/23 |
| JP | 2017184129 A | * | 10/2017 | |

OTHER PUBLICATIONS

International Preliminary Report on Patentability received for PCT Patent Application No. PCT/IB2021/061601, dated Jul. 13, 2023, 11 pages.

\* cited by examiner

TIME-LAPSE

FIELD OF THE INVENTION

Embodiments described herein relate to computer systems; more particularly, embodiments described herein relate to user interface functionality for tablet or other computer systems executing graphics drawing applications.

BACKGROUND

Handwriting and manually-created art continue to play important roles in human communication. Computer tablets have been adapted to permit handwriting input, and are also commonly used for art creation. However, even though tablets are being used for art creation, the use of pen tools and fingers with the existing user interfaces of the touch surface display screens of tablets make the creation of such artwork difficult and unsatisfying when generating vector graphics.

SUMMARY

A method and apparatus for generating a time-lapse video are disclosed. In one embodiment, the method comprises: storing each instruction that is executed by a vector graphics application to create artwork on a display of a computer system during one or more editing sessions as part of an undo history; and generating a time-lapse video using the undo history.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the present invention are directed to systems and methods for performing a vector graphics application for a tablet (e.g., an iPad, etc.) or other computer system (e.g., laptop computer system, desktop computer system, smart phone, etc.) with enhanced user interface capabilities. These enhanced user interface capabilities allow a user to better interact with a vector graphics application program (or other drawing program) executing on a computer system using input methods from a mouse and/or keyboard, a pen tool (e.g., Apple pencil, etc.) and/or finger. In one embodiment, these capabilities include generating and manipulating ruler and guide lines for an artboard interface, providing feedback while using the vector graphics application via a hover mode, identifying a last node of a vector path with a marker as part of vector graphics operations while a user is creating and manipulating artwork in a user interface, providing help information to a user with respect to features of the vector graphics application in a help mode, enabling a user to vectorize an image with the vector graphics application, performing precision movements of images and drawing elements on a touch-surface display screen using a user interface component, and generating a time-lapse video with the vector graphics application. Each of these will be described in more detail below. Note also that the techniques described herein are not limited to vector graphics application programs and may be applicable for use with a graphic creation tool, regardless of graphics type (e.g., pixel drawing tools). Having briefly described an overview of the present invention, embodiments of the invention will be discussed with reference to FIGS. 1-17.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Having briefly described embodiments of the present invention, an exemplary operating environment suitable for use in implementing embodiments of the present invention is described below.

Figure 1A:
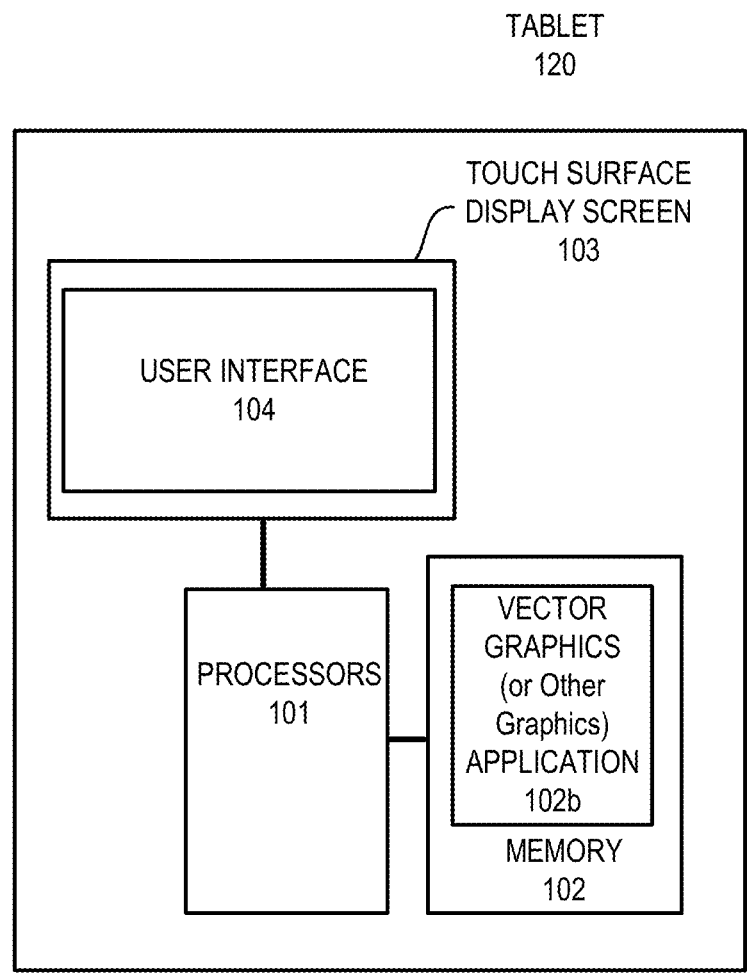
FIG. 1A is a block diagram of a tablet or other computer system

Referring to the drawings in general, and initially to FIG. 1A, which is a block diagram of a tablet or other computer system. Referring to FIG. 1A, tablet 128 comprises one or more processors 101 coupled to a memory 102 and a touch-surface display screen 103. Touch-surface display screen 103 displays a user interface 104. Memory 102 stores, among other data, a vector graphics or other graphics application program 102A. Processors 101 performs vector graphics operations on images displayed in a touch surface by screen 103 by executing vector graphics application program 102A. In one embodiment, the vector graphics application program 102A performs vector graphics operations on one or more images displayed in user interface 104 on touch-surface display screen 103. As mentioned above, and discussed in more detail below, the vector graphics application 102A, when executed by processors 101, provides a number of user interface tools that enable a user to more easily perform vector graphics application operations in a tablet environment.

Figure 1B:
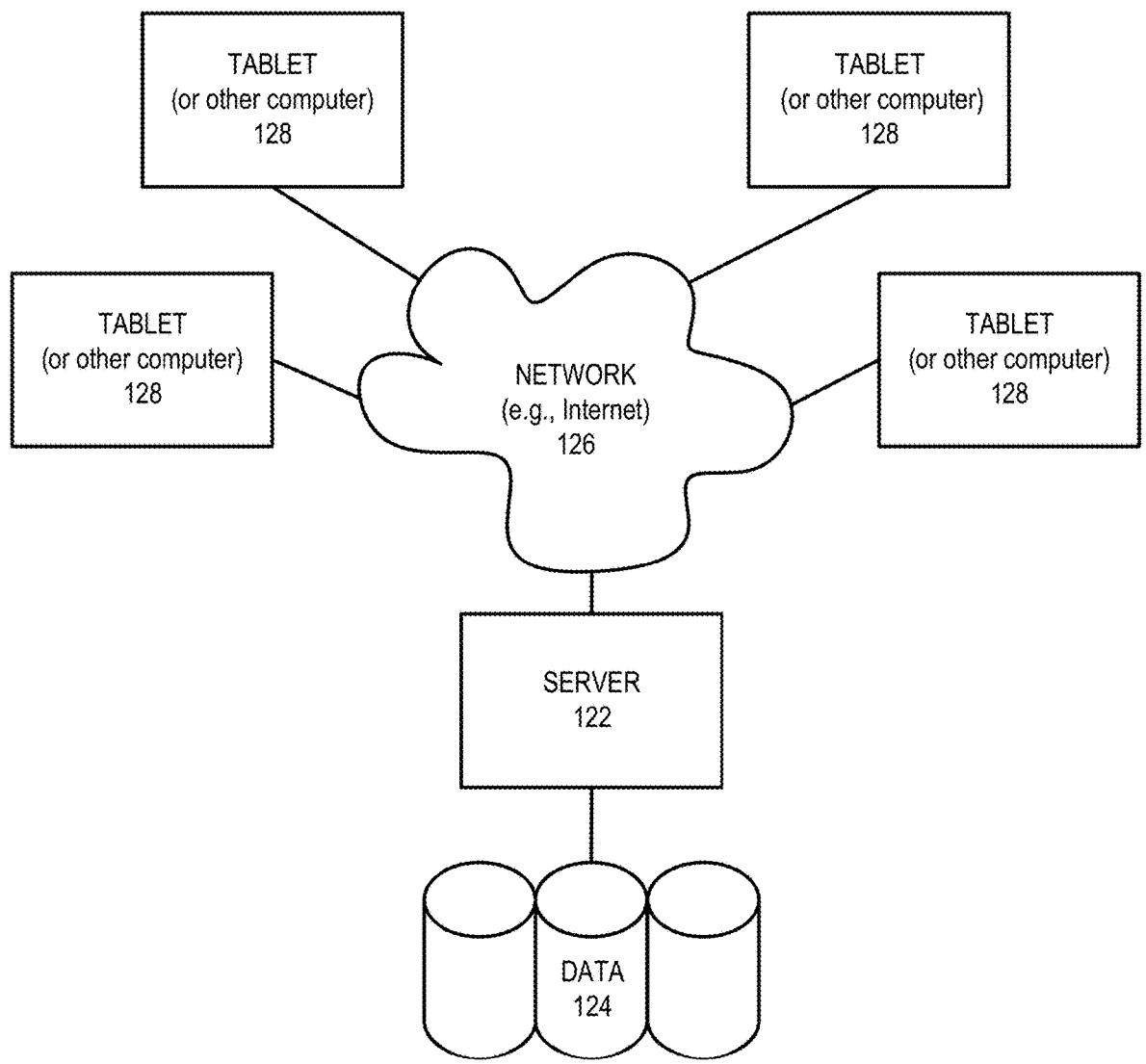
FIG. 1B illustrates a computing system environment.

FIG. 1B illustrates a computing system environment, with which embodiments of the present invention may be implemented is illustrated and designated generally as reference numeral 120. It will be understood and appreciated by those of ordinary skill in the art that the illustrated computing system environment 120 is merely an example of one suitable computing environment and is not intended to suggest any limitation as to the scope of use or functionality of the invention. Neither should the computing system environment 120 be interpreted as having any dependency or requirement relating to any single component or combination of components illustrated therein.

In one embodiment, the computer system environment includes one or more tablet (or other) computer systems 128, such as shown above in FIG. 1A. Each tablet computer system 128 may operate in a computer network 126 using logical connections to a server 122. Exemplary computer networks 126 may include, without limitation, local area networks (LANs) and/or wide area networks (WANs). Such networking environments are commonplace in offices, enterprise-wide computer networks, intranets, and the Internet. When utilized in a WAN networking environment, the control server 122 may include a modem or other means for establishing communications over the WAN, such as the Internet. In a networked environment, program modules or portions thereof may be stored in association with control server 122, the database cluster 124, or any of remote computers 128. For example, and not by way of limitation, various application programs may reside on the memory associated with any one or more of remote computers 128. It will be appreciated by those of ordinary skill in the art that the network connections shown are exemplary and other means of establishing a communications link between the computers (e.g., control server 122 and remote computers 128) may be utilized.

With continued reference to FIG. 1B, the exemplary computing system environment 120 includes a general-purpose computing device in the form of a server 122. Components of server 122 may include, without limitation, a processing unit, internal system memory, and a suitable system bus for coupling various system components, including database cluster 124, with server 122. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Server 122 typically includes therein, or has access to, a variety of computer-readable media, for instance, database cluster 124. Computer-readable media can be any available media that may be accessed by server 122, and includes volatile and nonvolatile media, as well as removable and non-removable media. By way of example, and not limitation, computer-readable media may include computer storage media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by server 122. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1B, including database cluster 124, provide storage of computer-readable instructions, data structures, program modules, and other data for server 122.

Figure 2:
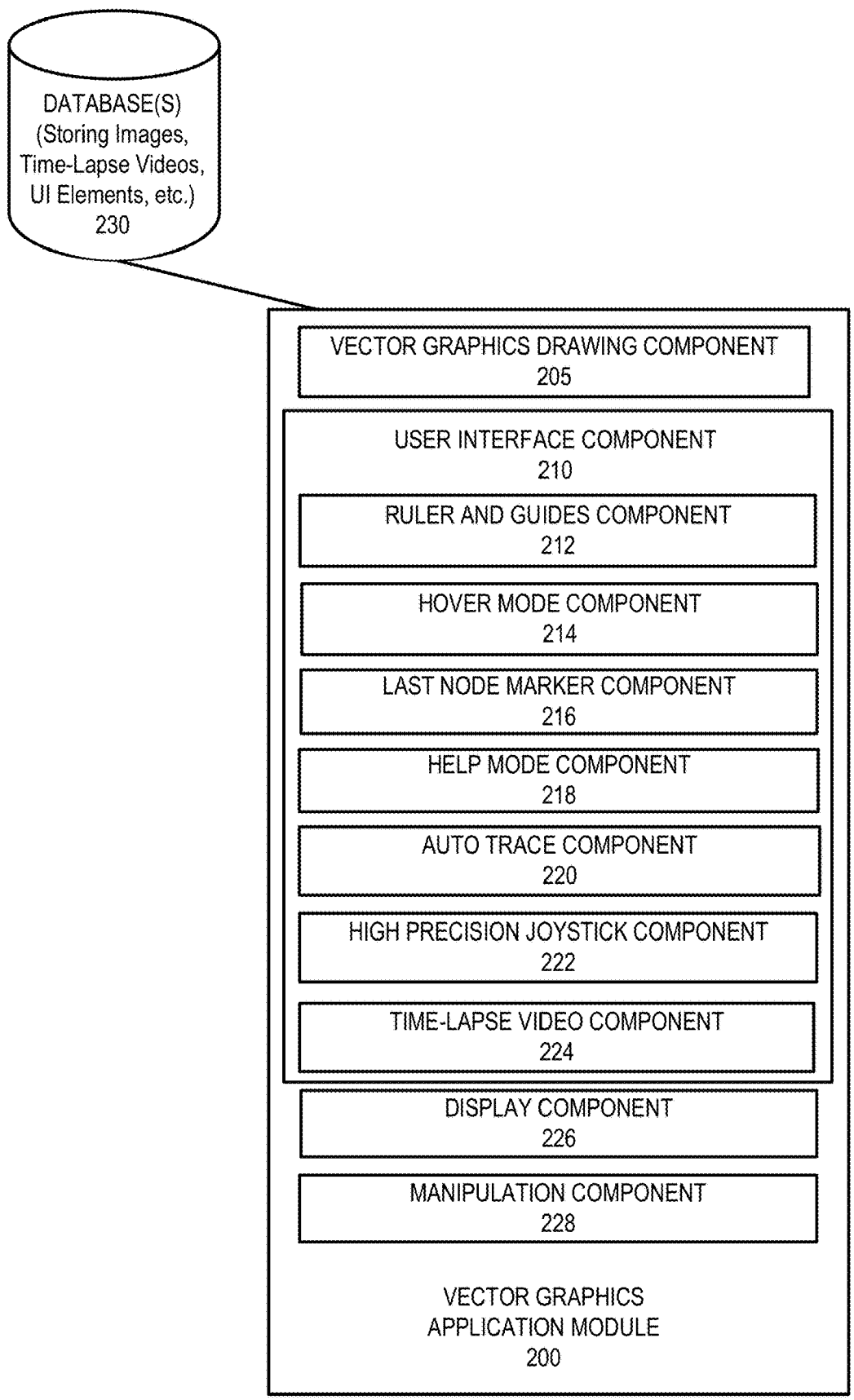
FIG. 2 is a block diagram showing one embodiment of a computing system architecture for a vector graphics application program.

With reference to FIG. 2, a block diagram is illustrated that shows an example of a computing system architecture for performing operations with a graphics application, such as a vector graphics application program running on a tablet (e.g., iPad) or other computer system. It will be appreciated that the computing system architecture shown in FIG. 2 is merely an example of one suitable computing system and is not intended as having any dependency or requirement related to any single module/component or combination of modules/components.

In one embodiment, the computing system includes a vector graphics drawing component 205 to perform vector graphics for the vector graphics application module 200 using information from one or more databases 230 (or other memories).

In one embodiment, the computing system includes user interface component 210 for generating user interface elements through which a user is able to access and use features and functions of the vector graphics application module 200.

In one embodiment, the user interface component 210 includes a ruler and guide lines component 212 to control the use of rulers and guide lines for an artboard, a hover mode component 214 to control hover operations for vector graphics application module 200, a last node component 216 to identify a last node of a vector path as part of vector graphics operations for vector graphics application module 200, a help mode component 218 to provide help information to a user of vector graphics application module 200, an auto trace component 220 to enable a user to vectorize an image using vector graphics application module 200, a high precision joystick component to move drawing elements displayed in a user interface by vector graphics application module 200, and a time-lapse video component 224 to generate a time-lapse video using vector graphics application module 200.

Display component 222 includes a graphical display device that may be a touch surface display screen, a monitor, computer screen, project device or other hardware device for displaying graphical user interfaces containing images and other data from artwork. In one embodiment, display component 222 displays the GUI with the list of selectable user interface elements with which a user of the display component interacts and employs.

In one embodiment, a manipulation component 228 allows a user to manipulate a touch surface display. For example, a user may desire to interact with touch surface display to add guide lines to an artboard, hover over one or more GUI elements, move or otherwise exploit a last node of a vector path, access help information for the vector graphics application by performing a long press, vectorize an image that is displayed in a user interface of the vector graphics application, move drawing elements displayed in a user interface of the vector graphics application at more precise movements, or generate a time-lapse video.

The components described above enable a tablet or other computer system to execute a vector graphics application with improved user interface capacities. More details regarding these improved user interface capacities are described below.

Artboard Guides & Rulers

In one embodiment, the user interface includes an artboard that can display a visual ruler. In one embodiment, the visual ruler is attached to the artboard and moves with the artboard. In one embodiment, the rules have scales and adapt to the user's artboard on the tablet (or other computer system) displaying the artboard and ruler(s). The ruler adapts by extending to cover the entire artboard. For example, if a visual ruler is included on the artboard, then the horizontal portion and the vertical portion extend horizontally and vertically, respectively, across the artboard. Note in an alternative embodiment, a visual ruler only extends horizontally across the artboard (without a vertical portion) or only extends vertically across the artboard (without a horizontal portion).

In one embodiment, guides are included in the artboard for use in position images or elements that are displayed on the artboard. In one embodiment, the user is able to create guides at a desired location in the artboard. In one embodiment, guides appear as non-printing lines that float over the image in an artboard. In one embodiment, the user is able to create visual guides by interacting with the rulers with a cursor control device such as, for example, a pen tool, a finger, or another well-known device. The vector graphics application receives information regarding the interaction and creates guides in response thereto. In one embodiment, the user interacts with the ruler by using a cursor control device to tap on and drag a ruler. In response to such an action, the vector graphics application creates a guide that extends horizontally or vertically from the point in the ruler at which the user stops dragging. In one embodiment, the guide may not be placed until the user stops performing a press operation with respect to the cursor control device.

Figure 3:
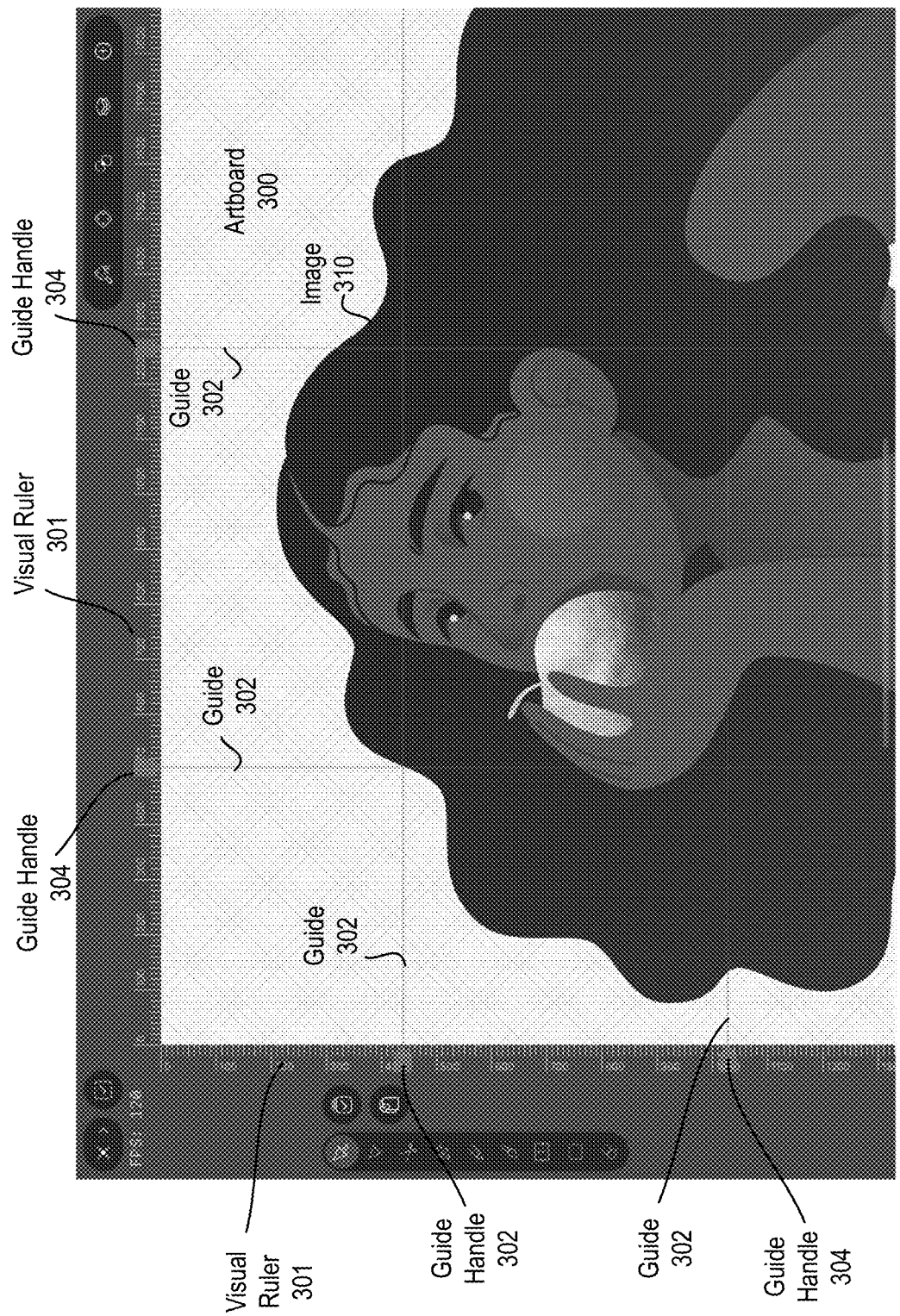
FIG. 3 illustrates an example of one embodiment of an artboard user interface generated by a vector graphics application.

FIG. 3 illustrates an example of one embodiment of an artboard user interface generated by a vector graphics application. Referring to FIG. 3, artboard 300 is generated by a vector graphics application executing on a tablet (e.g., iPad) or other computer system. An image 310 is displayed on artboard 300. Visual rulers 301 are attached to artboard 300 and appear horizontally and vertically across artboard 301. As shown, visual rulers 301 include a scale with markers and numbers.

In one embodiment, the rulers can be hidden. In one embodiment, the rulers are hidden by selecting a setting in a menu of the user interface with a cursor control device. In one embodiment, the rulers are hidden when zooming out with multiple artboards being displayed in the user interface while the guides remain visible. In other words, when the result of zooming out causes more than one artboard to be visible, the rulers disappear and guides still appear. In one embodiment, the rulers are hidden when an artboard is selected or moving.

In one embodiment, the vector graphics application supports horizontal and vertical zoom operations. In response to either of these zoom operations, the vector graphics application sets a proportional value to modify the amount of information displayed on the visual ruler, such as the interval that it displays. In one embodiment, the interval takes as a parameter the dimension of an artboard and the current scale for marking at a resolution of $\frac{1}{2}\hat{~}n$. This yields to the ruler's zoom in or out behavior, where it provides more or less detail, respectively. In one embodiment, the ruler uses metric units and the metric unit intervals for the ruler at scales 13%, 25%, 50%, 100%, 200%, 400%, 800%, and greater than 800%.

As discussed above, guides 302 can be used to help a user of the vector graphics application position images, such as image 310, or elements precisely and are created by clicking anywhere on a ruler with a cursor control device. In one embodiment, in a settings option the user can define if the rulers and/or the guides are visible or hidden from the UI. For example, in FIG. 3A, the user clicks on each of the guide handles 304 in rulers 301 to cause one of guides 302 to appear on the display of artboard 300.

In one embodiment, guides may be moved. In one embodiment, a guide is moved by clicking and dragging on the guide handle inside a ruler. More specifically, when a user uses a cursor control device to click on a guide in the ruler and drag it to another location in the ruler, then the vector graphics application receives the cursor location information and knows to move the guide to the new location.

In one embodiment, to remove it completely, a user uses a cursor control device to drag the guide outside of the ruler or uses the cursor control device to touch and hold a guide in an artboard to select the guide, which causes the cursor control information to be received by the vector graphics application, causing it to reveal the delete option to the user. By performing either action, the guide disappears.

In one embodiment, to remove multiple guides at the same time, the user performs a control-click operation with a cursor control device on one of the rulers and selects an option to remove all vertical guides or remove all horizontal guides. In one embodiment, this option is used on macOS-based devices.

A user may interact with a guide to cause a change in the user interface displayed on the tablet. In one embodiment, the vector graphics application includes a context menu from which the user selects options for changing the user interface. For example, in one embodiment, right clicking on a guide handle, such as one of guide handles 304, using a cursor control device, gives the option to: create a vertical/horizontal guide, remove a vertical or horizontal guide, remove all vertical guides (if the clicked guide was vertical), and remove all horizontal guides (if the clicked guide was horizontal).

In one embodiment, tapping and holding on a handle in a ruler causes a guide to enter a selected state; while holding the handle, the guide can enter a moving state in which the guide is moved; tapping on an empty area in a ruler causes a new guide to be created, swiping left on a horizontal handle causes a horizontal guide to be deleted; and swiping up on a vertical handle causes a vertical guide to be deleted.

In one embodiment, the use of guides enables performing snapping. In one embodiment, using snapping, the vector graphics application can place things where the user wants them to be instead of where the user actually moves them with the imprecise mouse or tablet pen movements. In one embodiment, as soon as a user moves a drawing element on the artboard close enough (e.g., within a predetermined distance (e.g., 1 mm, 2 mm, etc.) to a guide, the drawing element snaps to and aligns with that guide. Note that in one embodiment, snapping only happens when a user drags something with the mouse or tablet pen, but not when a user moves things by arrow keys on the keyboard, such that the objects are moved and they will not snap to guidelines.

In one embodiment, the vector graphics application enables a user to control the use of guides through a settings menu. In one embodiment, the settings menu provides a menu option to show rules that allows a user to enable or disable the rulers in an active artboard. In one embodiment, the settings menu provides a menu option to show guides that allows a user to show or hide the guides created in the artboards of a document.

Figure 4:
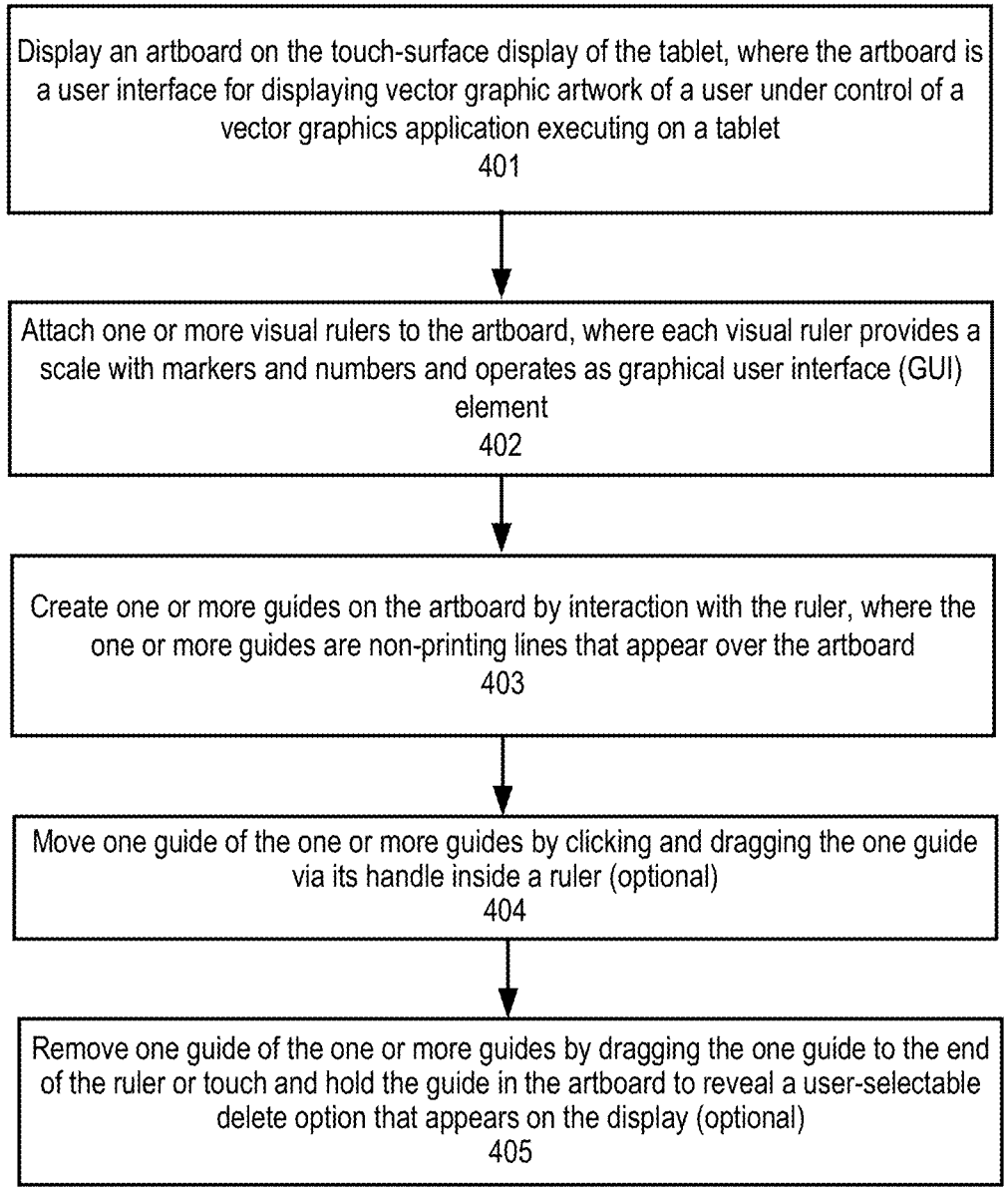
FIG. 4 is a flow diagram of one embodiment of a process for displaying rulers and guides on an image being displayed on an artboard.

FIG. 4 is a flow diagram of one embodiment of a process for displaying rulers and guides on an image being displayed on an artboard. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program.

Referring to FIG. 4, the process begins by displaying an artboard on a touch surface display screen of the tablet (processing block 401). In one embodiment, the artboard is a user interface for displaying vector graphics artwork of a user under control of the vector graphics application executing on the tablet (or another computer system).

Next, processing logic attaches one or more visual rulers to the artboard, where each visual ruler operates as a graphical interface (GUI) element with which the user is able to interact (processing block 402). In one embodiment, each ruler includes a scale with markers and numbers.

Processing logic creates one or more guides on the artboard by interacting with one or more of the rulers (processing block 403). The one or more guides are non-printing lines that appear over the artboard and any image being displayed therein. In one embodiment, the guides are visible when the rulers are visible. In another embodiment, the guides are visible even when the rules are not visible. In yet another embodiment, whether the guides are visible when the rule is visible is based on a setting that may be set by a user. In one embodiment, processing logic creates one or more guides by tapping a cursor position on one or more of the rulers and dragging the cursor position (while holding) to a location on the ruler from where a guide is to extend (horizontally or vertically) over the artboard.

In one embodiment, the vector graphics application, when executing, is operable to scale the one or more visual rulers to extend along the length and width of the artboard to adapt to the artboard's size.

Optionally, processing logic moves one or more of the guides by clicking on (and holding) and dragging on a guide, via its handle, inside a ruler (processing block 404). That is, where the guide starts at the ruler, the user is able to click on with the mouse or other cursor control device and drag the guide within the ruler in order to reposition the guide so it appears in another location over the artboard.

Optionally, processing logic removes one or more of the guides by clicking on (and holding) and dragging one of the guides to the end of the ruler or touching and holding the guide in the artboard to reveal a user-selectable delete GUI element (e.g., a delete window or bubble, etc.) that may be selected by the user with the cursor control device to delete the individual guide (processing block 405).

The Hover Mode

In one embodiment, the vector graphics application operates in a hover mode. In the hover mode, a user is provided feedback as the user drags their finger or pen across the touch-surface display screen of the tablet. In one embodiment, this information comprises points, guides, measurements, and a focus/highlight indicator (displaying information about elements the user's cursor is focused or placed on). In the case of points, in the hover mode, the vector graphics application is able to automatically recognize points (e.g., anchor points) and provide visual feedback to the user to let the user know that an anchor point exists on the artboard.

The use of the hover mode is important when using a vector graphics application on a tablet as users need more feedback with the lack of precision that is involved with touch-surface display screens in general. That is, touch surface devices have great features but they still lack the desired feedback for the user. This brings challenges especially when a user needs to draw with precision. This new feature will give a tablet user (e.g., an iPad user) precision and feedback that they desire when using a vector graphics application.

Note that in desktop devices, the mouse cursor is always present on the screen and the cursor can be seen moving along the whole path as the user moves the cursor, thereby giving the impression of hovering. In the drawing context, this allows a user to preview, receive feedback and interact with other elements because the software knows the mouse position. In contrast, while working on tablets such as, for example, but not limited to, an iPad (with the apple pen or the finger), the software only gets information as long as the user holds its finger on the touch surface Thus, there are limitations when using such devices as it is not possible to preview paths or interact with not selected objects. In one embodiment, to overcome these limitations, the hover mode described herein adds a new state that allows the simulation of the hover interactions on the tablet (e.g., iPad) like that of the desktop on the iPad.

More specifically, in a desktop, using a mouse requires two interfaces, physical (your hand) and the cursor (software), that allows for more levels of interaction and precision. While touchscreen input is a single interface (e.g., finger, pen tool (e.g., Apple pencil)). Cursors are relatively smaller than the size of your finger, allowing more accuracy and higher information density. A right click is conventionally used for context menus and options, while a left click is used to select and confirm actions, double clicking, etc. Thus, unlike a finger, the cursor is always on the display, which means a user can trigger changes on the screen without commitment (click), allowing for an entire level of interaction that is not available on touchscreen devices.

With design tools, accuracy is a big concern of users. In order to build a touchscreen friendly design software, the user experience is improved with the vector graphics application described herein to accommodate for all the missing perks that the mouse can offer. To reach a desktop-level of accuracy, the vector graphics application described herein uses a feature set that helps bring the accuracy of touch-input to the same level as mouse input, starting with the joystick, that helps nudge and move objects by point (described in more detail below), or the Hover mode where a multi-touch gesture solution triggers the hover effect of cursors onto a touch surface, thereby allowing for high accuracy of a mouse with the high usability of a finger.

By releasing the pen or the finger of the screen the last registered position remains displayed on screen. The user can release the hover mode or press the content-aware controller to set the node on position.

In one embodiment, the hover mode is implemented using state. State consists of a singular touch area on the touch-surface display that once held extends the current workflow. In one embodiment, the state properties include the following:

This state will be active while holding the touch area on the canvas (referring to all material on the screen except for user interface elements (e.g., control elements))

When releasing this area, the state is dismissed

States touch area can be moved to anywhere in the canvas

If the user desires, they can lock the state by double tapping the button (or hold and up)

If locked the state can be unlocked by tapping on the button again, or by clicking on a dismiss button at the top of the canvas While on this mode the user will be on a "isolated mode", which mean the user cannot select any other tool or click in the inspector options while in the state The "click" action while in the hover mode is performed in the following ways:
    releasing the state button
    by pressing a content aware button In one embodiment, the pen hover state happens in the following stages, given the user is drawing with the pen tool:
1. User is drawing with the pen tool
2. User activates the hover mode, by pressing and holding or locking it.
3. As soon as the user drags his finger or pen on the touch surface display screen, all the hover feedback is displayed below the touched area; if the user releases the pen, the hover information remains in the last position.

A user can set a node in two ways:
1. If the user releases the pen or the finger, a content-aware button appears next to the hover node and the content-aware button offers some options for the user as setting node or changing node type.
2. If a user releases the hover mode, then the node is set on canvas.
3. If the user locks the hover mode, it can place many nodes without leaving the hover mode.

In one embodiment, feedback to display while in the hover mode includes the following:
Rubberband: a user sees a preview of his next path segment;
Interact with nodes of not selected objects;
Smart-guides while drawing with the pen tool;
Measurements and dimensions;
Hover indicators like to perpendicular shapes, intersections, joining and closing indicators; and
Straight or 45 degrees lines.

Figure 5A:
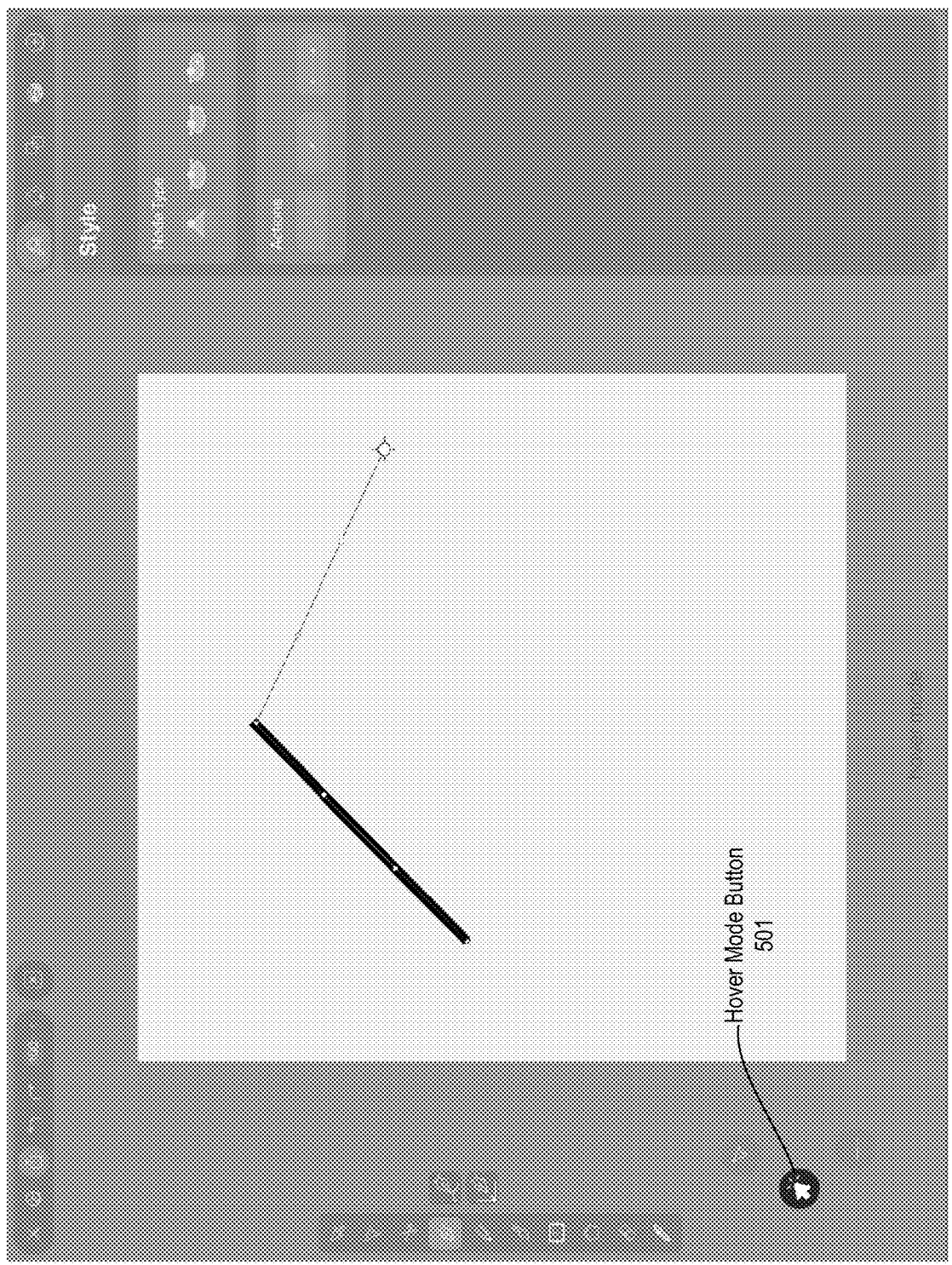
FIG. 5A illustrates one embodiment of a hover mode graphical user interface (GUI).

FIG. 5A illustrates one embodiment of a hover mode GUI. Referring to FIG. 5A, a user can select hover mode button 501 to activate hover more.

Figure 5B:
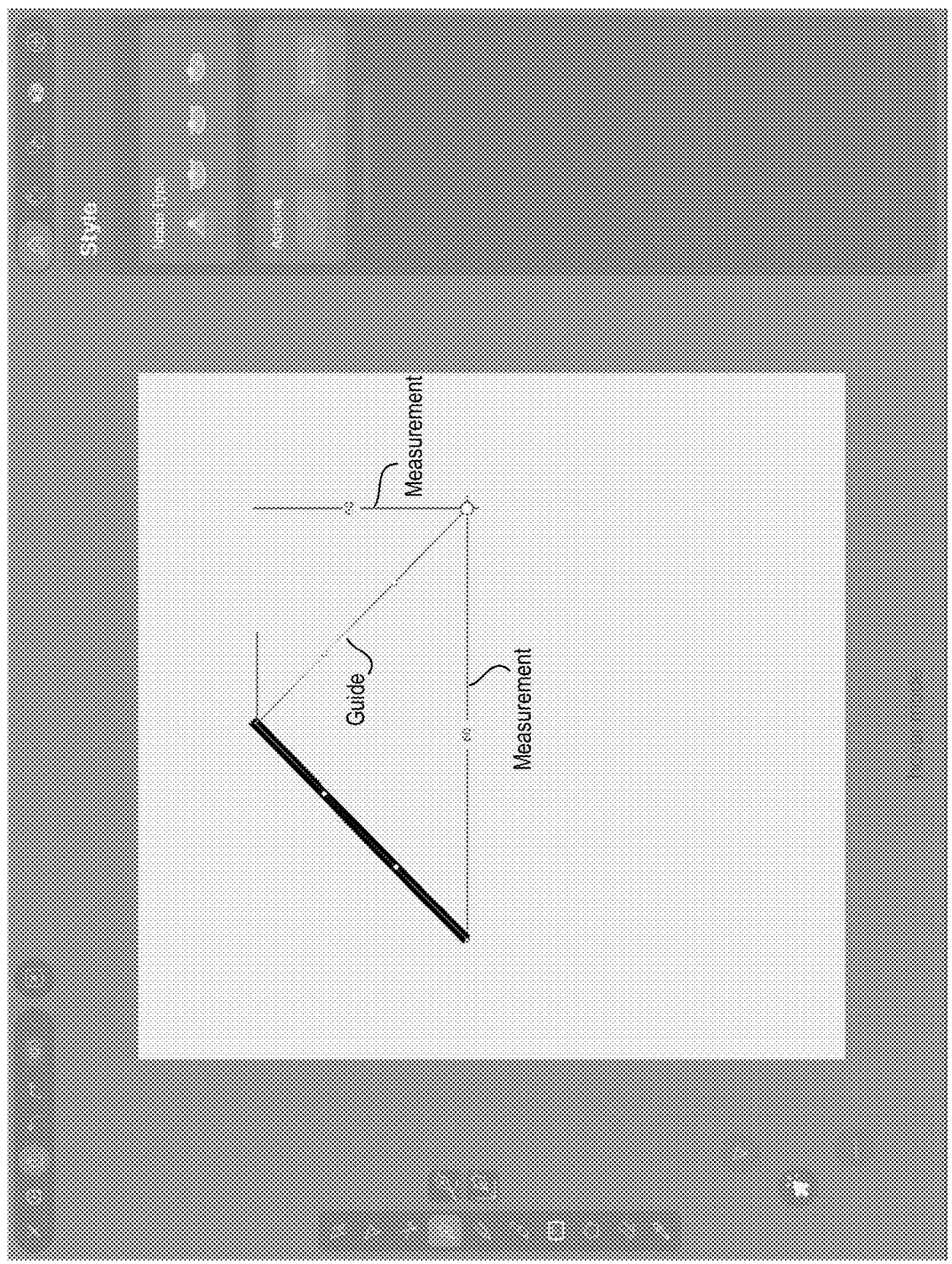
FIG. 5B illustrates that the user, while in hover mode, is dragging the finger or the pen across the display screen and receiving the feedback as guides and measurements.

FIG. 5B illustrates that the user, while in hover mode, is dragging the finger or the pen across the display screen and receiving the feedback as guides and measurements.

Figure 5C:
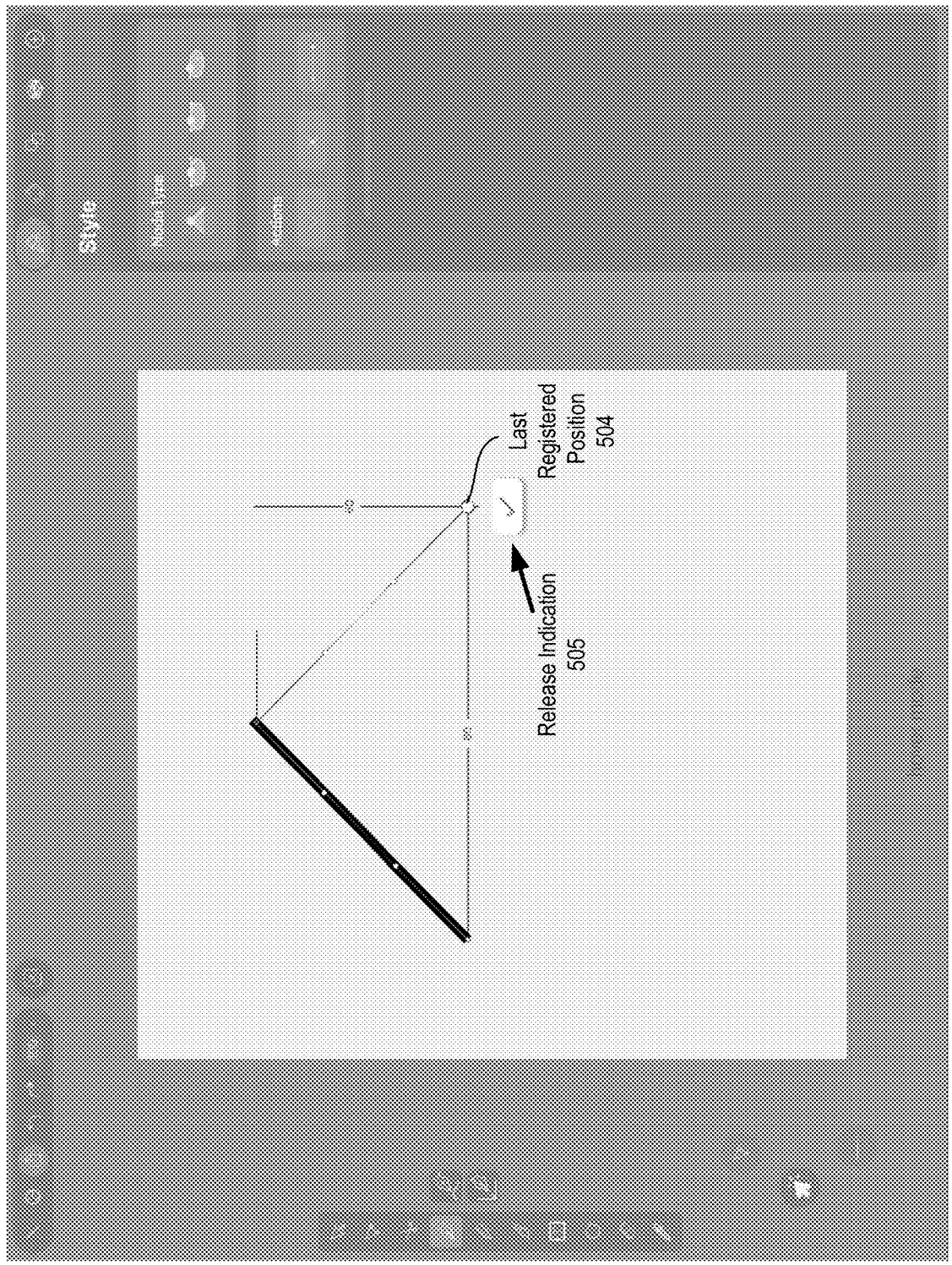
FIG. 5C illustrates releasing the pen or the finger of the display screen while in hover mode.

FIG. 5C illustrates that by releasing the pen or the finger of the display screen while in hover mode, then the last registered position remains displayed on screen. Referring to FIG. 5C, last registered position 504 is displayed on the screen with a release indication 505 to indicate to the user which element on the display screen was the location of where the user released their finger or pen tool from the display screen.

In one embodiment, the user can release the hover mode or press the content-aware controller to set the node on position.

Figure 6:
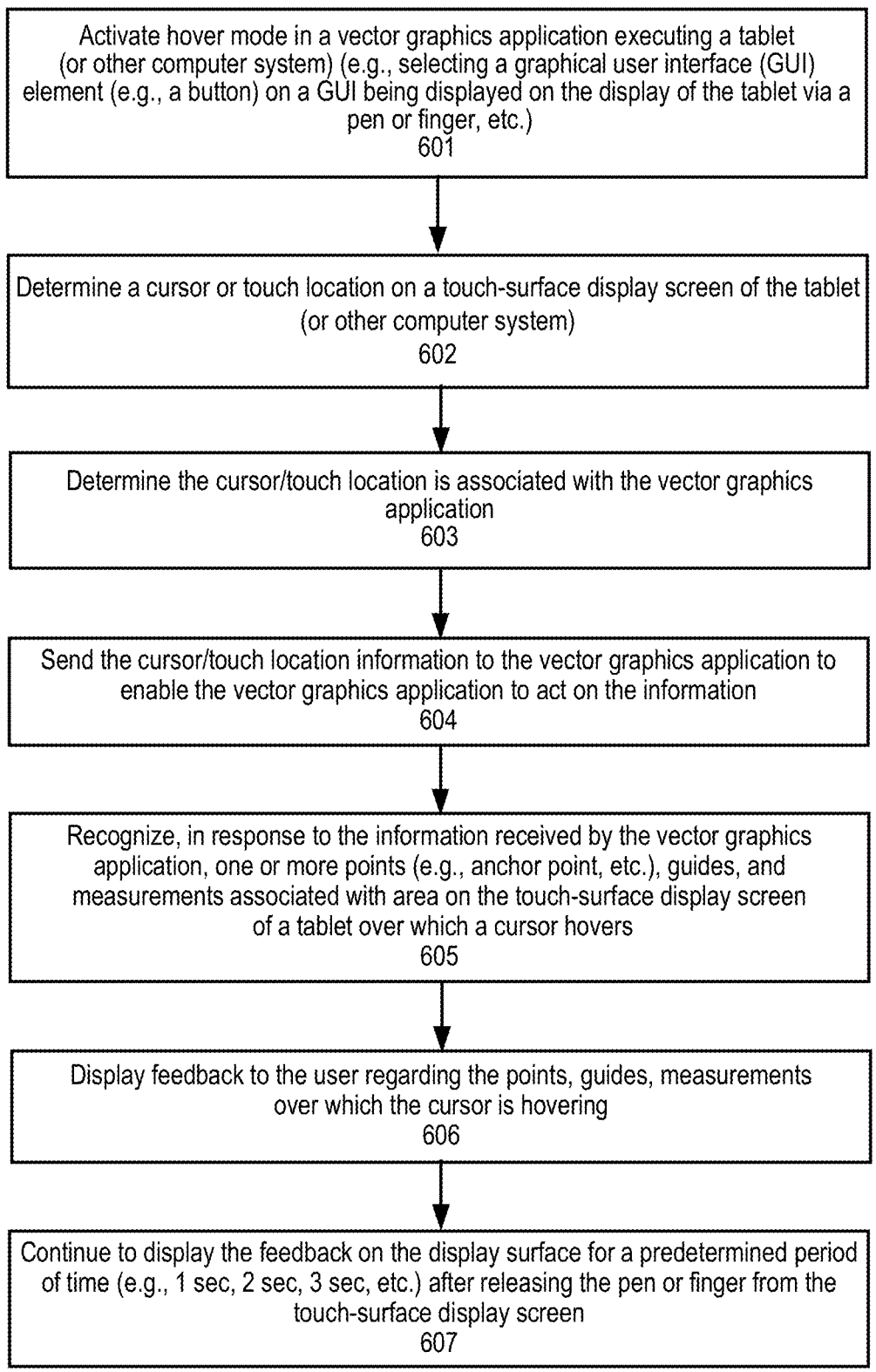
FIG. 6 is a flow diagram of one embodiment of a process for processing data in a vector graphics application in a hover mode.

FIG. 6 is a flow diagram of one embodiment of a process for processing data in a vector graphics application in a hover mode. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program.

Referring to FIG. 6, the process begins by activating a hover mode in a vector graphics application executing on a tablet (or other computer system) (processing block 601). In one embodiment, activating the hover mode is performed by selecting a GUI element (e.g., a button) on a graphical user interface being displayed on a display of the tablet. In one embodiment, the selection may be made by a pen or by a finger. In one embodiment, the selection may be by another cursor control device or implement.

Once in the hover mode, the processing logic determines the cursor/touch location on a touch-surface display screen of the tablet (processing block 602) and determines the cursor/touch location is associated with the vector graphics application (processing block 603). In one embodiment, this determination is based on identifying that the cursor/touch location is within the touch-surface display screen that is controlled by the vector graphics application (e.g., the cursor/touch location is within a window or other user interface displayed by the vector graphics application). In response thereto, processing logic sends cursor/touch location information to the vector graphics application to enable the vector graphics application to act on the information (processing block 604).

In response to the information received by the vector graphics application, processing logic recognizes one or more points, guides, measurements, and a focus/highlight indicator (displaying information about elements the user's cursor is focused or placed on) associated with the area on the touch-surface display screen of the tablet over which the cursor hovers (processing block 605). In one embodiment, the one or more points comprise anchor points.

Then processing logic displays the feedback to the user regarding the points, guides, and measurements associated with the area over which the cursor is hovering (processing block 606). For example, if the processing logic determines that the point is an anchor point, processing logic displays a graphic or other display element to indicate to the user that the point over which they are hovering is an anchor point. Thus, the vector graphics application recognizes the one or more points, guides and measurements and displays the feedback associated with these while a user drags a pen or finger across the touch-surface display as part drawing on the tablet as part of executing a vector graphics application in a hover mode.

In one embodiment, processing logic continues to display the feedback on the display screen for a predetermined period of time after releasing the pen or finger on the touch-surface (processing block 107). That is, once the user hovers over an element with their pen tool or their finger and then removes the pen tool or the finger from the display surface, processing logic continues to display the feedback for a predetermined period of time. In one embodiment, the period of time may be a predetermined number of seconds (e.g., 1 second, 2 seconds, 3 seconds, a predetermined number of frames per second (e.g., for 24 fps, 48 frames, 60 frames, etc.), etc.). This is optional. In other embodiments, the hover information is only displayed as long as the hover mode is active (e.g., the pen tool or finger is over an element).

Last Node Marker

Vectors have a start and an end. In one embodiment, the vector graphics application represents a vector path with at least a first, or starting, node and a last, or end, node. In order to enable identification of these nodes, in one embodiment, the first and last nodes are marked differently so that a user is able to distinguish the two and take any actions (e.g., drawing actions, etc.) based on this information. In one embodiment, the first and last nodes are marked with a different color. In another embodiment, the first and last nodes are marked with a different shape. In yet another embodiment, the first and last nodes are marked with a different color and a different shape. In this way, the last node is marked differently from the first or other nodes for clearer visibility to the user.

In one embodiment, depending on the position the node has on a vector path, it can be named differently, namely either a first node, a last node or an end node. A first node is the first, or starting, node set of a path, regardless if closed or an open path. The last node is the last node set of a path, regardless if closed or an open path. End nodes are the first and last nodes of an open path. The vector graphics application will "remember" and indicate which was the last added node to a vector path, and this anchor point will be displayed differently. In one embodiment, for open paths, the vector graphics application indicates where the shape will continue drawing and for a closed shape where that path it will open.

Figure 7A:
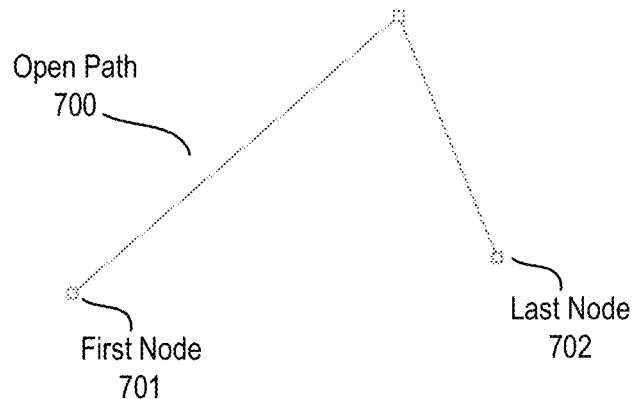
FIGS. 7A-7D illustrate examples of first and last nodes being displayed differently.

FIGS. 7A-7D illustrate examples of first and last nodes being displayed differently. Referring to FIG. 7A, open path 700 includes a plurality of nodes, including first node 701 and last node 702. The vector graphics application depicts first node 701 in a first color (e.g., blue) and last node 702 with a second color (e.g., red) that is different than the first color.

Figure 7B:
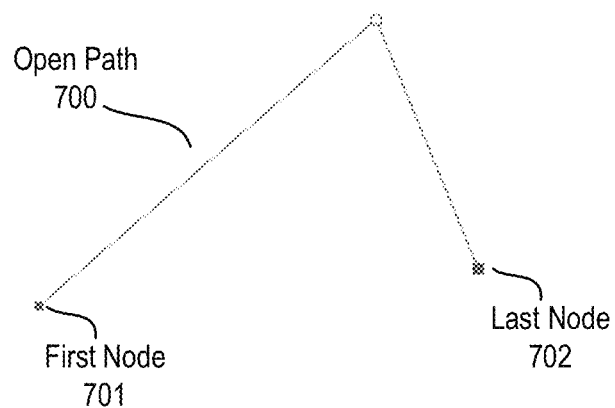

Referring to FIG. 7B, open path 700 is depicted with selected nodes. More specifically, first node 701 is depicted in a first color (e.g., blue), while last node 702 is depicted with a second color (e.g., red) that is different than the first color. However, while both first node 701 and last node 702 were depicted as non-filled-in squares in FIG. 7A, the squares are filled in to indicate they have been selected as part of the operation of the vector graphics application. Even so, the outer edges of the squares representing first node 701 and last node 702 are still represented with the same colors as prior to selection, namely, with the vector graphics application depicting first node 701 in a first color (e.g., blue) and last node 702 with a second, different color (e.g., red).

Figure 7C:
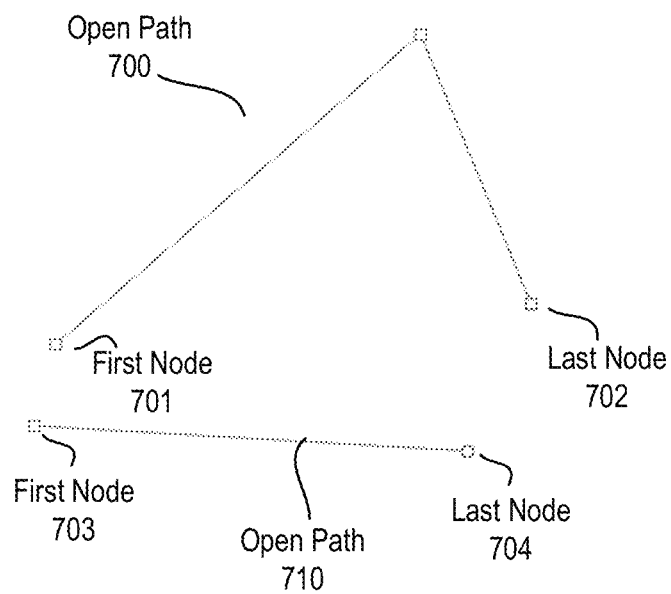

Referring to FIG. 7C, multiple open paths 700 and 710 are depicted. Open path 700 includes a plurality of nodes, including first node 701 and last node 702, with first node 701 being depicted in a first color (e.g., blue), while last node 702 being depicted with a second, different color (e.g., red). Open path 710 includes a plurality of nodes, including first node 703 and last node 704, with the vector graphics application depicting first node 703 in a first color (e.g., blue) and last node 704 with a second, different color (e.g., red).

Figure 7D:
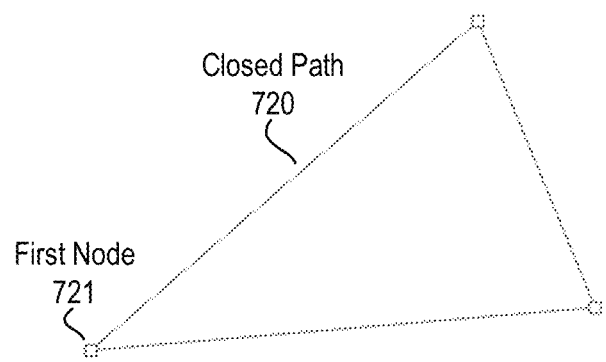

Referring to FIG. 7D, closed path 702 includes a plurality of nodes, and the vector graphics application depicts last node 721 with a color (e.g., red) that is different from the other nodes (e.g., blue).

In one embodiment, the vector graphics application provides an end path drawing, which is a visual representation of the last node click to end the path drawing. By clicking on this option, a user ends the drawing and leaves the path open, and it is ready to start a new one.

Figure 8:
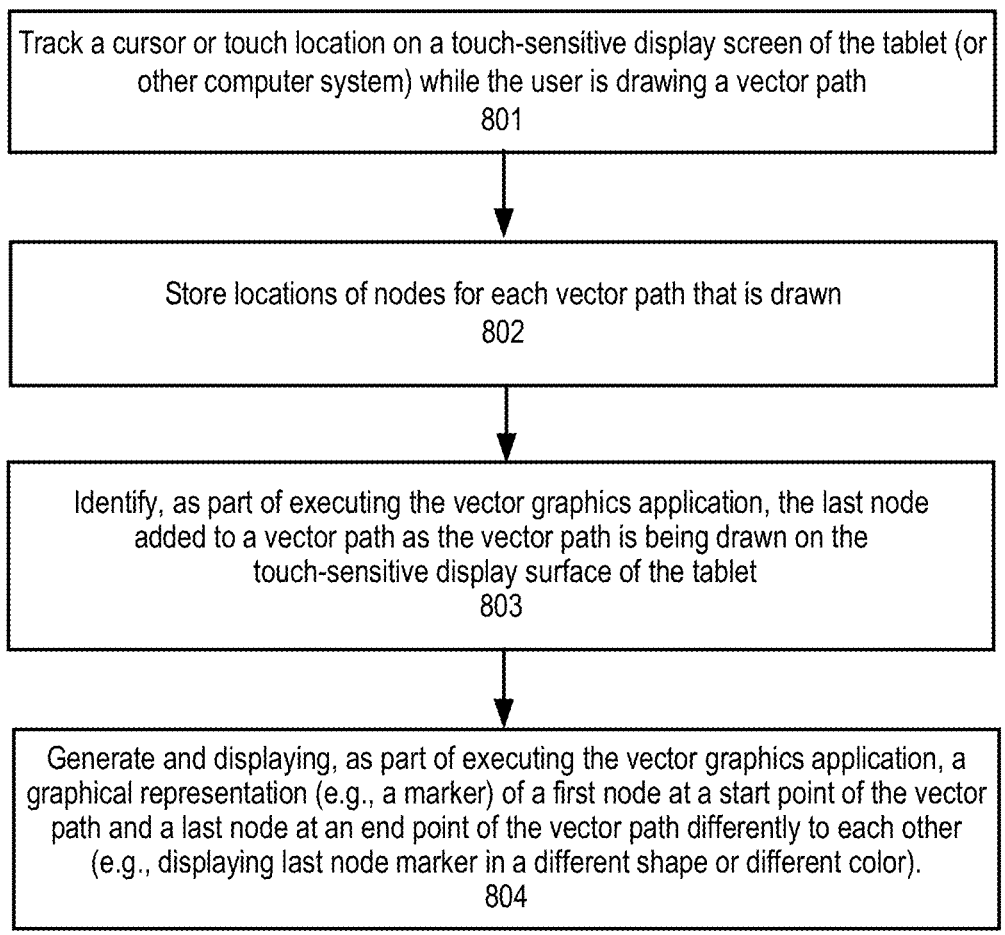
FIG. 8 is a flow diagram of one embodiment of a process for displaying the last node marker.

FIG. 8 illustrates one embodiment of a process for displaying the last node marker. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program.

Referring to FIG. 8, the process begins by processing logic tracking a cursor or touch location on a touch surface display screen of a tablet (or other computer system) while the user is drawing one or more vector paths using a vector graphics application (processing block 801). While tracking the cursor, processing logic stores locations of nodes for each vector path that is drawn (processing block 802). As part of the vector graphics application, processing logic identifies the last node added to a vector path as the vector path as it's being drawn on the touch-surface display surface of the tablet (processing block 803). In response to identifying the last node added to a vector path as the vector path, processing logic generates and displays, as part of executing the vector graphics application, a graphical representation such as, for example, but not limited to, markers for the first node at a starting point of the vector path and of a last node at an end point of the vector path differently to each other (processing block 804). That is, in one embodiment, the last node has a different marker than the first node (and the other nodes) and they are different in shape and/or color.

Long Press for Help

Long Press for Help is an accessibility feature provided by the vector graphics application that helps users learn about functions and features inside the application. In one embodiment, the feature provides three levels of contextual information:

1. Help tooltip—Provides a title description for visual GUI elements.
2. Help window—Provides further details about the corresponding feature.
3. Online wiki—Links the user directly with an online wiki, which provides a complete description of the selected feature. This should be the last resort to learn about a given feature.

In one embodiment, the vector graphics application enables a user to hold on any UI element in the user interface of the vector graphics application to obtain help information regarding the features and functions associated with that UI element. In one embodiment, the user holds the UI element for a period of time that exceeds the time that is needed to select the UI element to use the features and functions associated with the UI element (i.e., the user has performed a long tap). In response to holding on such a UI element, a bubble or other pop-up window appears on the user interface to provide the help information. The bubble or pop-up also provides access to more information. In one embodiment, the bubble or pop-up also provides access to more information by including a link (e.g., an Internet link) that may be selected to take the user to a network location having more help information regarding the UI element.

In one embodiment, the user interface provided by the vector graphics application also includes a help button on an action bar. Tapping on the help button reveals a pop up referred to herein as a help window, which informs a user about the Long Press for Help feature.

Figure 9A:
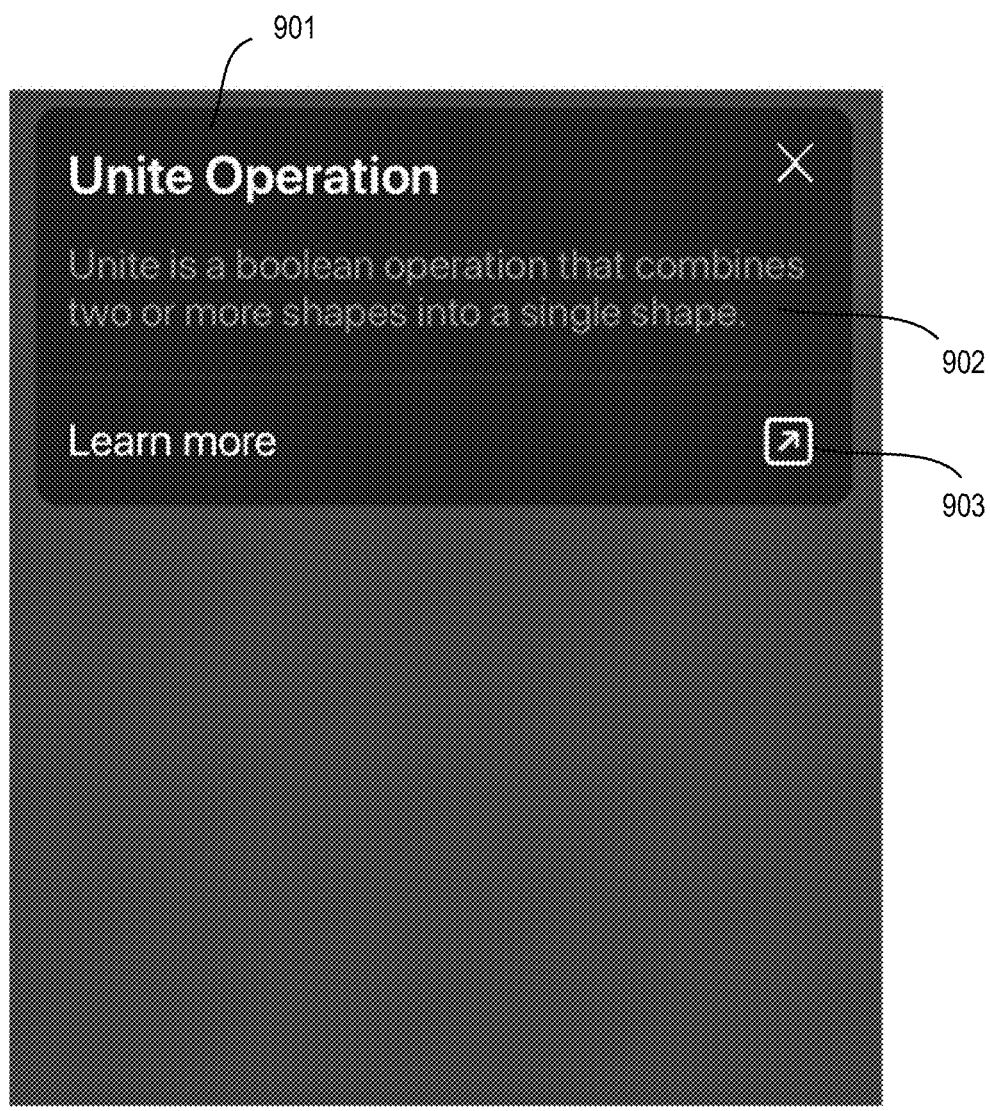
FIG. 9A illustrates one example of a help bubble.

FIG. 9A illustrates one example of a help bubble. Tapping and holding the UI element causes the vector graphics application to reveal the help bubble. Referring to FIG. 9A, the help bubble includes the following information:

1. Title 901: Title of the described feature;
2. A Single or multi paged area 902 that consists of a brief description of the feature; and
3. A learn more button 903: tapping will direct the user to an internet link.

Figure 9B:
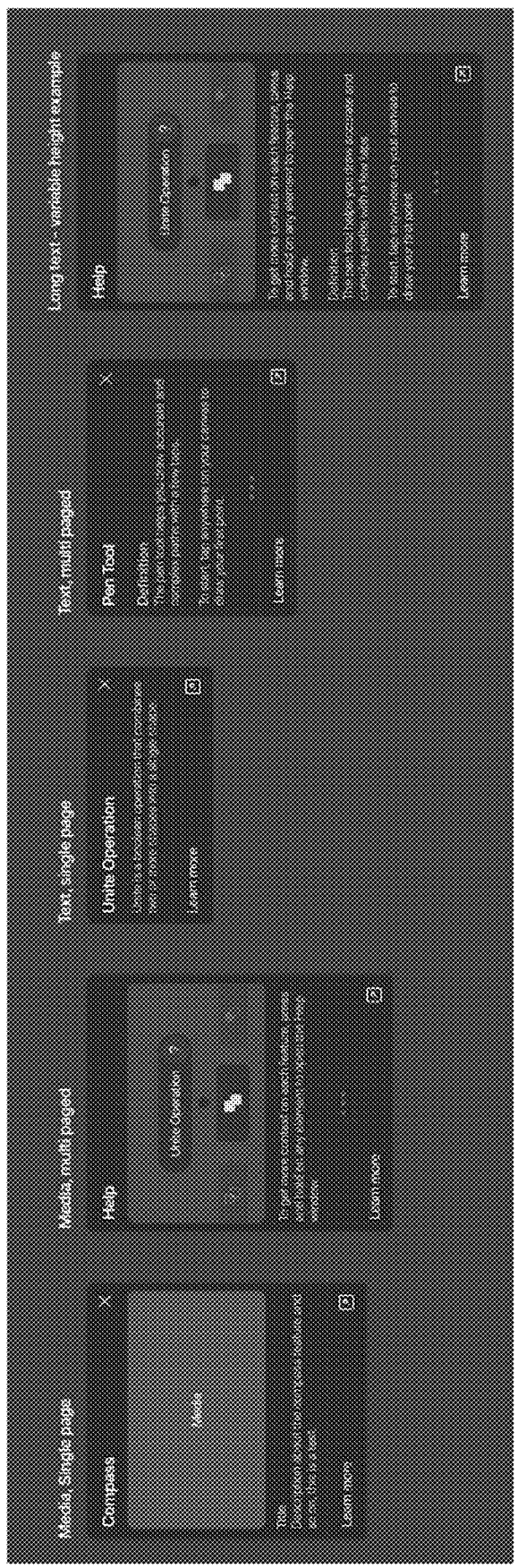
FIG. 9B illustrates examples of different types of help windows.

In one embodiment, the help windows/bubbles may have variable sizes (e.g., height, width, etc.) to accommodate the provided content. FIG. 9B illustrates examples of different types of help windows.

In one embodiment, tapping on a visual UI element in the user interface of the vector graphics application reveals a help tooltip that explains an icon or a visual element by providing the title description of a feature. If a long tap on the visual UI element occurs, then the vector graphics application reveals the help window.

Figure 10:
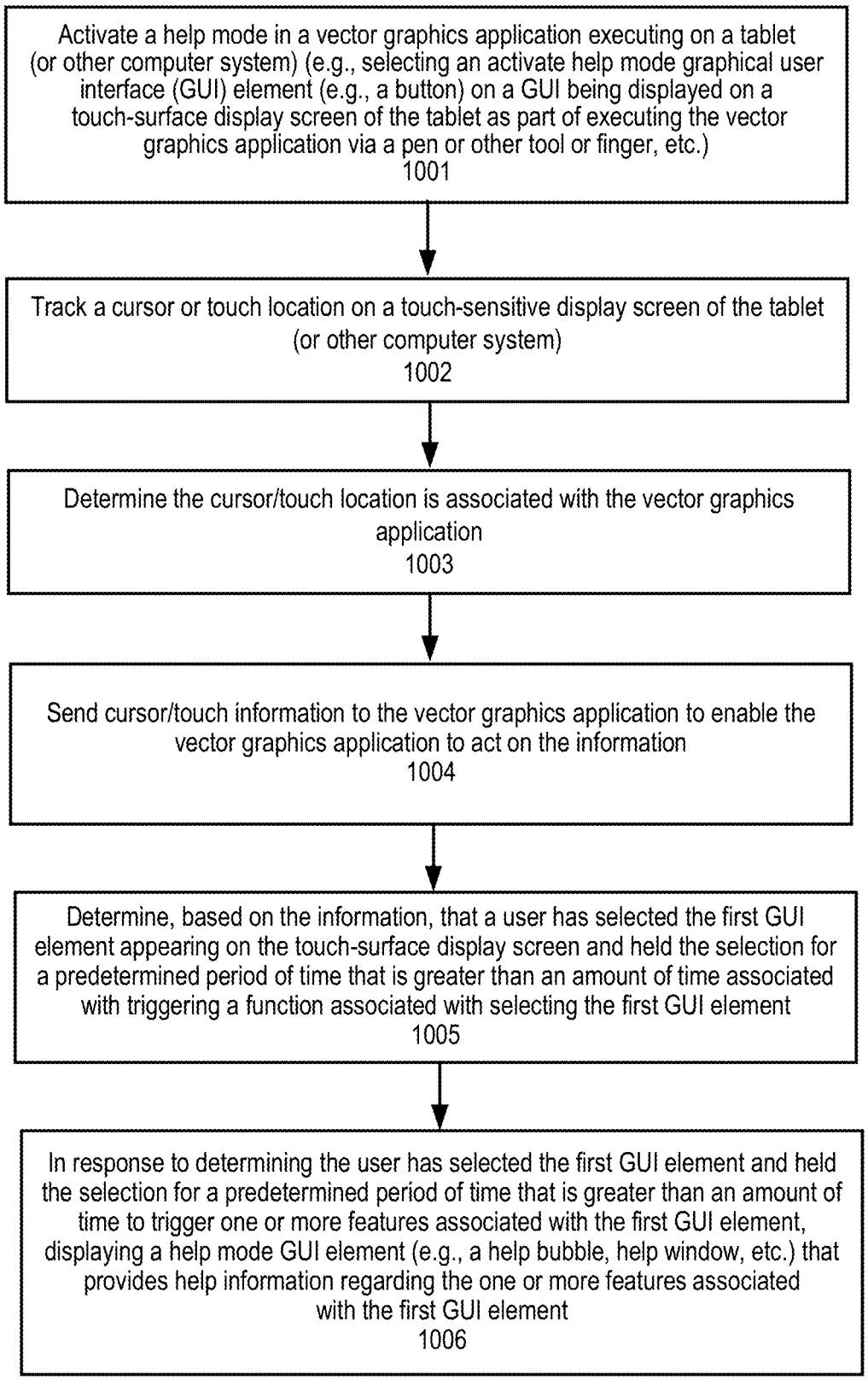
FIG. 10 is a flow diagram of one embodiment of the process for performing a help mode in a vector graphics application.

FIG. 10 illustrates one embodiment of the process for performing a help mode in a vector graphics application. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program.

Referring to FIG. 10, the process begins by activating the help mode in a vector graphics application executing on a tablet (or other computer system) (processing block 1001). In one embodiment, activating the help mode comprises selecting an activate help mode GUI element (e.g., a button) on a GUI being displayed on a touch-surface display screen of the tablet as part of executing the graphics application. In one embodiment, the selection may be made via a pen or other tool, or the user's appendage (e.g., a finger).

While in the help mode, processing logic tracks a cursor or touch location on the touch sensitive display screen of the tablet (or other computer system) (processing block 1002), determines the cursor/touch location associated with a vector graphics application (processing block 103), and sends the cursor/touch information to the vector graphics application to enable the vector graphics application to act on the information (processing block 1004).

In response to the information, processing logic determines that a user has selected a first GUI element appearing on in the user interface of the vector graphics application and held the selection for a predetermined period of time that is greater than the amount of time associated with triggering a function associated with selecting that GUI element (processing block 1005).

In response to determining the user has selected that GUI element and held the selection for a predetermined period of time that is greater than the amount of time to trigger one or more features associated with that GUI element, processing logic displays a help mode GUI element that provides information regarding the one or more features associated with that GUI element (processing block 1006). In one embodiment, this additional GUI element is a help bubble or help window that provides help information regarding that GUI element for which the user has selected and held the selection. That is, by, for example, pressing and holding the selection on a GUI element in the user interface while in the help mode, the processing logic recognizes that the user is seeking help and provides the help bubble/window to enable the user to obtain more information about that particular GUI element that the user has selected and held.

Auto Trace

In one embodiment, the vector graphics application provides a single GUI element in the user interface that a user can select to cause the vector graphics application to automatically convert an image in the user interface to vectors. Thus, the vector graphics application provides a single GUI element which converts images to vectors with one press without further configuration by the user. This is a vast improvement over prior art vector conversion processes that may require the user to click five different buttons to convert an image to vectors.

Figure 11A:
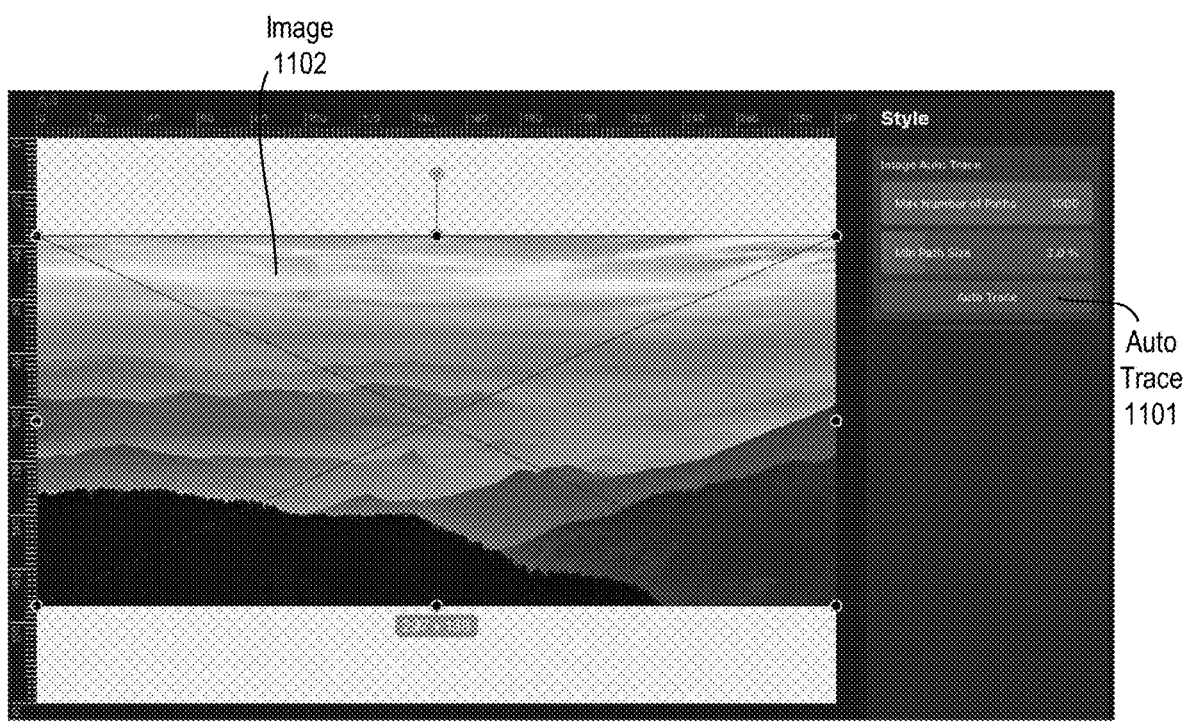
FIG. 11A illustrates an image that is not a vector image along with an auto trace button or other GUI element selectable by the user to cause the vector graphics application to convert the image into a vectorized image.

FIG. 11A illustrates an image that is not a vector image along with an auto trace button or other GUI element selectable by the user to cause the vector graphics application to convert the image into a vectorized image. Referring to FIG. 11A, in response to a user selecting the auto trace button 1101, the vector graphics application converts image 1102 to vectors.

Figure 11B:
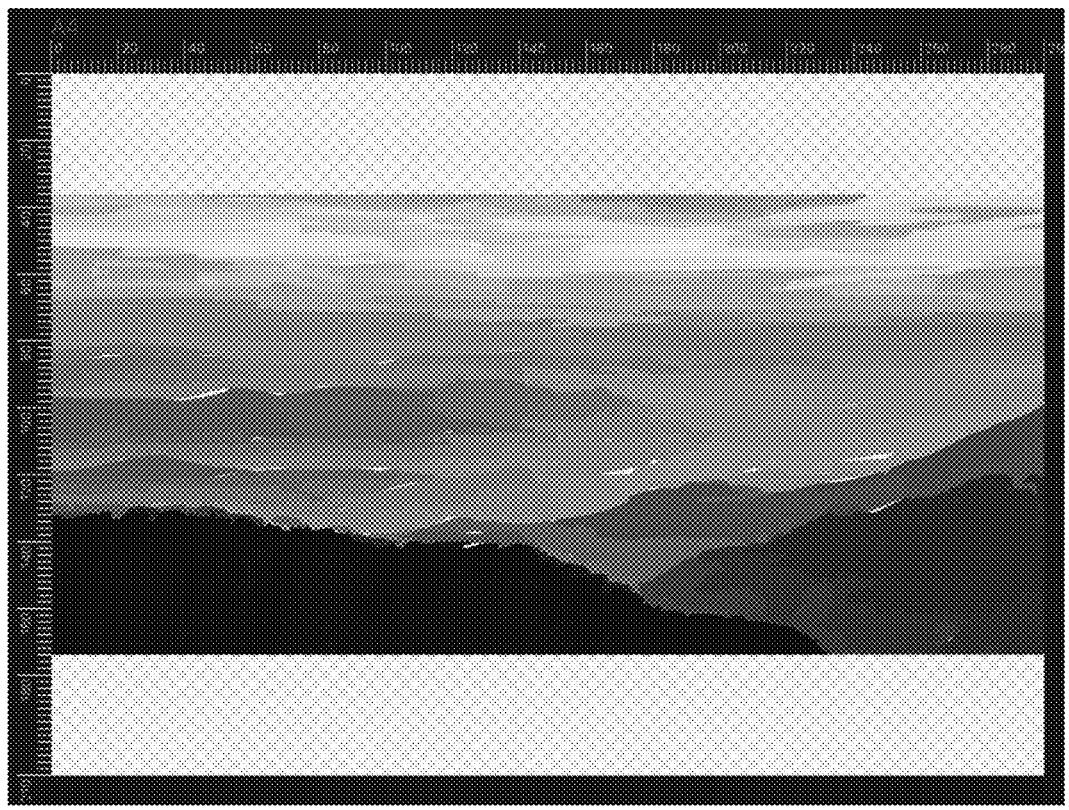
FIG. 11B is an example of a vectorized image that results from converting the image of FIG. 11A to vectors.

FIG. 11B is an example of a vectorized image that results from converting image 1102 of FIG. 11A to vectors.

In one embodiment, when a user inserts an image into the user interface, the vector graphics application automatically determines whether or not the image is a vectorized image. If the image is not a vectorized image, the vector graphics application automatically displays the auto trace button to provide the user an opportunity to convert the image to vectors.

Figure 12:
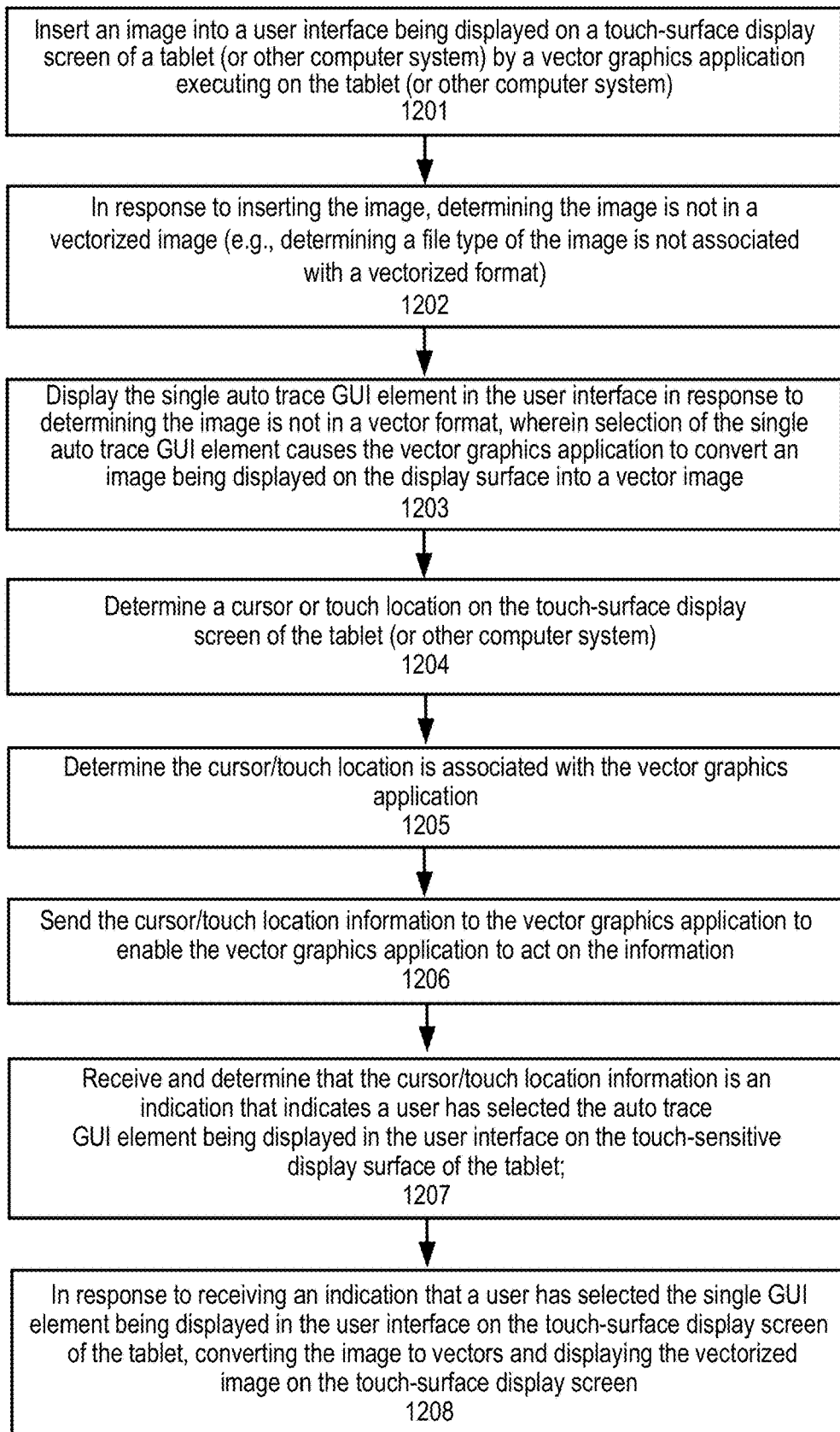
FIG. 12 is a flow diagram of one embodiment of a process for performing automatic trace of an image being displayed by a vector graphics application.

FIG. 12 illustrates one embodiment of a process for performing automatic trace of an image being displayed by a vector graphics application. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program. In another embodiment, the process is performed on a desktop running a vector graphics application program.

Referring to FIG. 12, the process begins by inserting an image into a user interface being displayed on a touch surface display screen of a tablet (or other computer system) by a vector graphics application executing on the tablet (or other computer system) (processing block 1201). In response to or after inserting the image, processing logic determines that the image is not a vectorized image (processing block 1202). In one embodiment, processing logic determines the image is not a vectorized image by determining a file type of the image and determining that that file type is not associated with the vectorized format. Note that in one embodiment, if a PDF file (e.g., a classic vector format) is imported, the PDF is transformed into the data mode of the vector graphics application and Auto Trace can still be performed on any included images as well, imported from the aforementioned PDF file.

After determining that the image is not a vectorized image, processing logic displays a single auto trace GUI element through the user interface that can be selected to cause the vector graphics application to invert the image being displayed in the display screen into a vector image (processing block 1203).

Once that single auto trace GUI element has been displayed, processing logic determines the cursor or touch location on the touch surface display screen (processing block 1204), determines that the cursor/touch location is associated with the vector graphics application (processing block 2105), and sends the cursor/touch location information to the graphics application to enable the vector graphics application to act on the information (processing block 1206). In one embodiment, the determination that the cursor/touch location is associated with the vector graphics application is made based on determining that the cursor/touch location is in an area of the display screen (e.g., a window on the display screen) controlled by the vector graphics application.

Processing logic determines that the cursor/touch location information is an indication that indicates the user has selected the single auto trace GUI element displayed on the touch surface display screen of the tablet is the GUI element to vectorize the image being displayed thereon (processing block 1207), and in response thereto, processing logic converts the image to vectors and displays the vectorized image on the touch-surface display screen (processing block 1208).

High Precision Joystick

In one embodiment, the vector graphics application provides a GUI element that may be used by the user to more vector elements in the user interface with high precision. This overcomes the problem of trying to have precision when moving elements in a user interface (e.g., artboard, canvas, etc.) displayed with a pen tool or a finger.

In one embodiment, using the precision movement GUI element, a user can nudge elements around the display screen using touch inputs. In one embodiment, by using the precision movement GUI, a user is able to have the vector graphics application move elements being displayed in the user interface in predetermined increments. In one embodiment, the predetermined increments are a predetermined number of pixels (e.g., 1 pixel, 2 pixels, etc.).

In one embodiment, there is a relationship between the current zoom level and moving objects using the GUI element (e.g., the joystick, etc.). In one embodiment, varying levels of precision can be achieved based on the current zoom level of the artboard where the predetermined number pixels that are moved with each increment is different based on the zoom level. For example, at one zoom level, each increment is a "1 pixel" increment while at another zoom level each increment is a "3 pixel" increment.

In one embodiment, the precision movement GUI element enables the user to indicate to the vector graphics application movements in a plurality of directions (e.g., left/right, up/down, etc.). In one embodiment, the precision movement GUI element includes indicia to indicate a direction of movement that a user may select and indicate direction to the vector graphics application. In one embodiment, the indicia include arrows.

In one embodiment, the precision movement GUI element comprises a joystick GUI element with four direction arrows, namely, up, down, left and right. By using the joystick GUI element, a user can cause an image to be moved with high precision (e.g., a predetermined number of pixels, etc.).

Figure 13A:
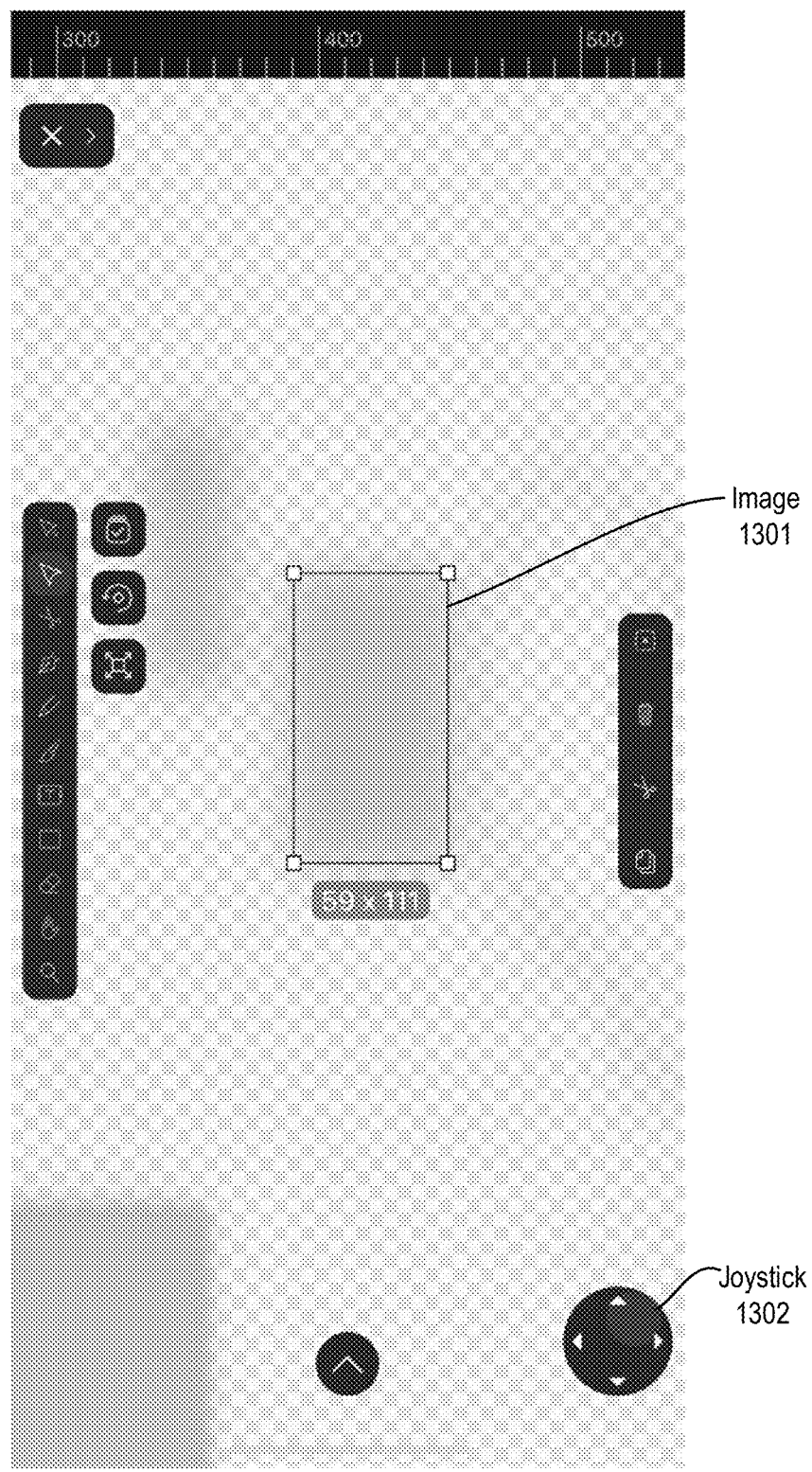
FIGS. 13A-13D illustrate the use of one embodiment of a joystick GUI element.
Figure 13B:
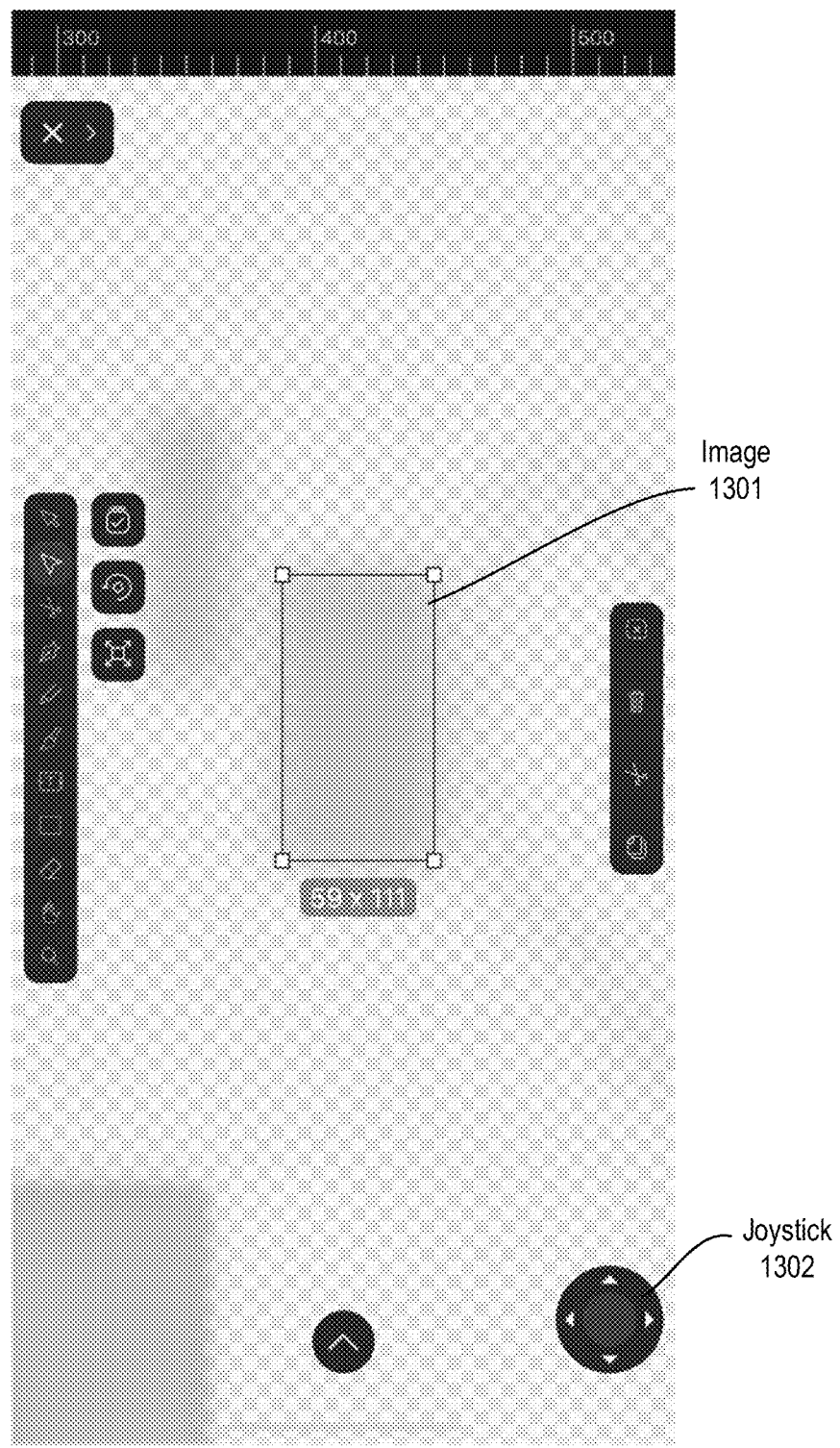
Figure 13C:
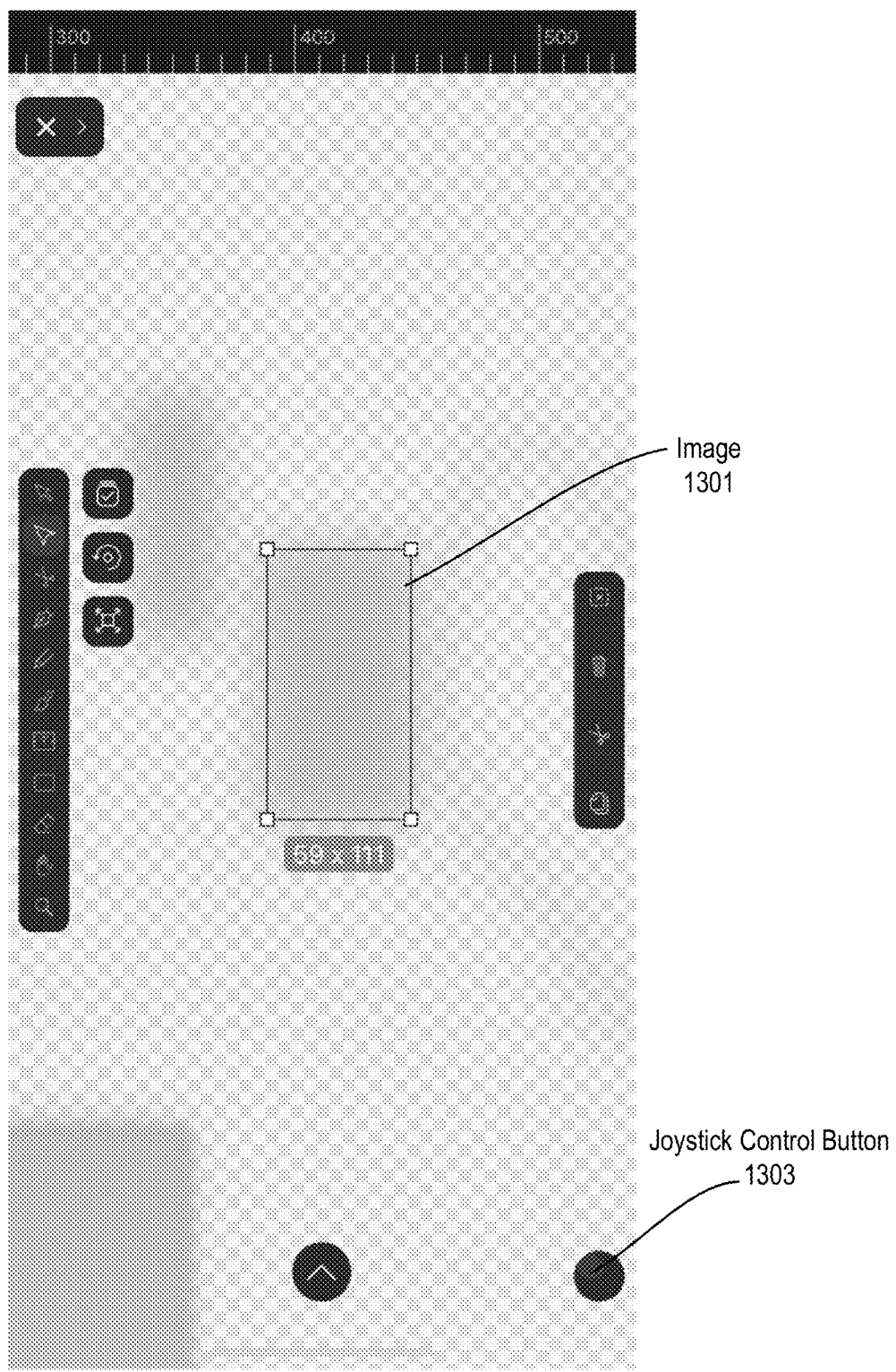
Figure 13D:
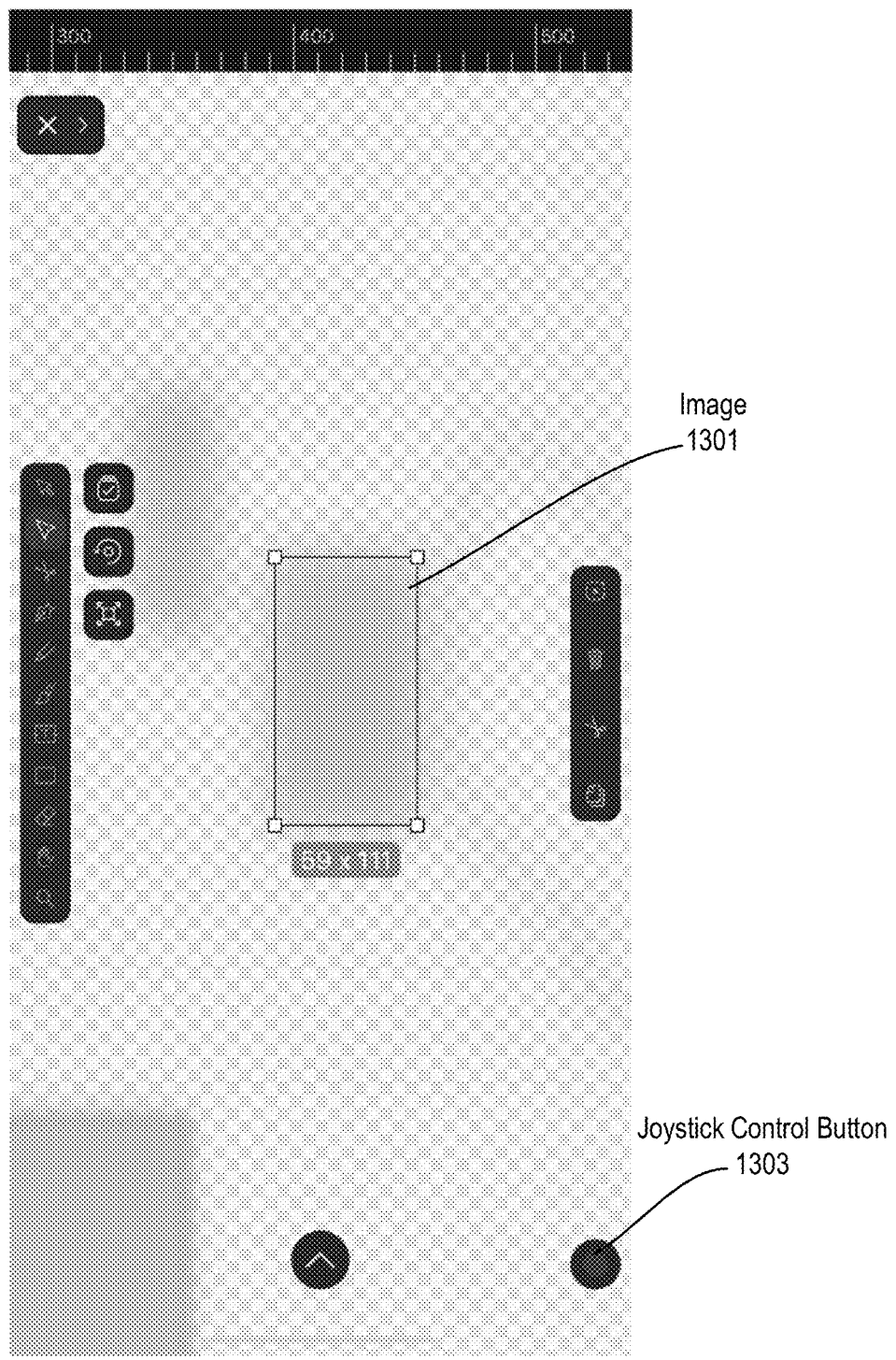

FIGS. 13A-13D illustrate the use of one embodiment of a joystick GUI element. Referring to FIG. 13A, an image 301 is displayed in a user interface of the vector graphics application. A joystick GUI 1302 appears on the user interface with arrows to select a direction the user wants to move image 301. After selecting the down arrow on joystick GUI 1302, the vector graphics application moves image 301 down 1 pixel. This is shown in FIG. 13B. After selecting the down arrow on joystick GUI 1302, the vector graphics application moves image 301 down another 1 pixel. This is shown in FIG. 13C. Finally, after selecting the down arrow on joystick GUI 1302, the vector graphics application moves image 301 down 1 pixel, which is shown in FIG. 13D. Note that the joystick control changing appearance in FIGS. 13C and 13D is visual feedback to indicate the user wants more precision. Note that in one embodiment, in this tiny mode, it has a tinier interface and thus it's harder to hit the exact angle. In one embodiment, the user is able to change the distance. Also, in one embodiment, the distance can be changed over time and getting faster.

Figure 14:
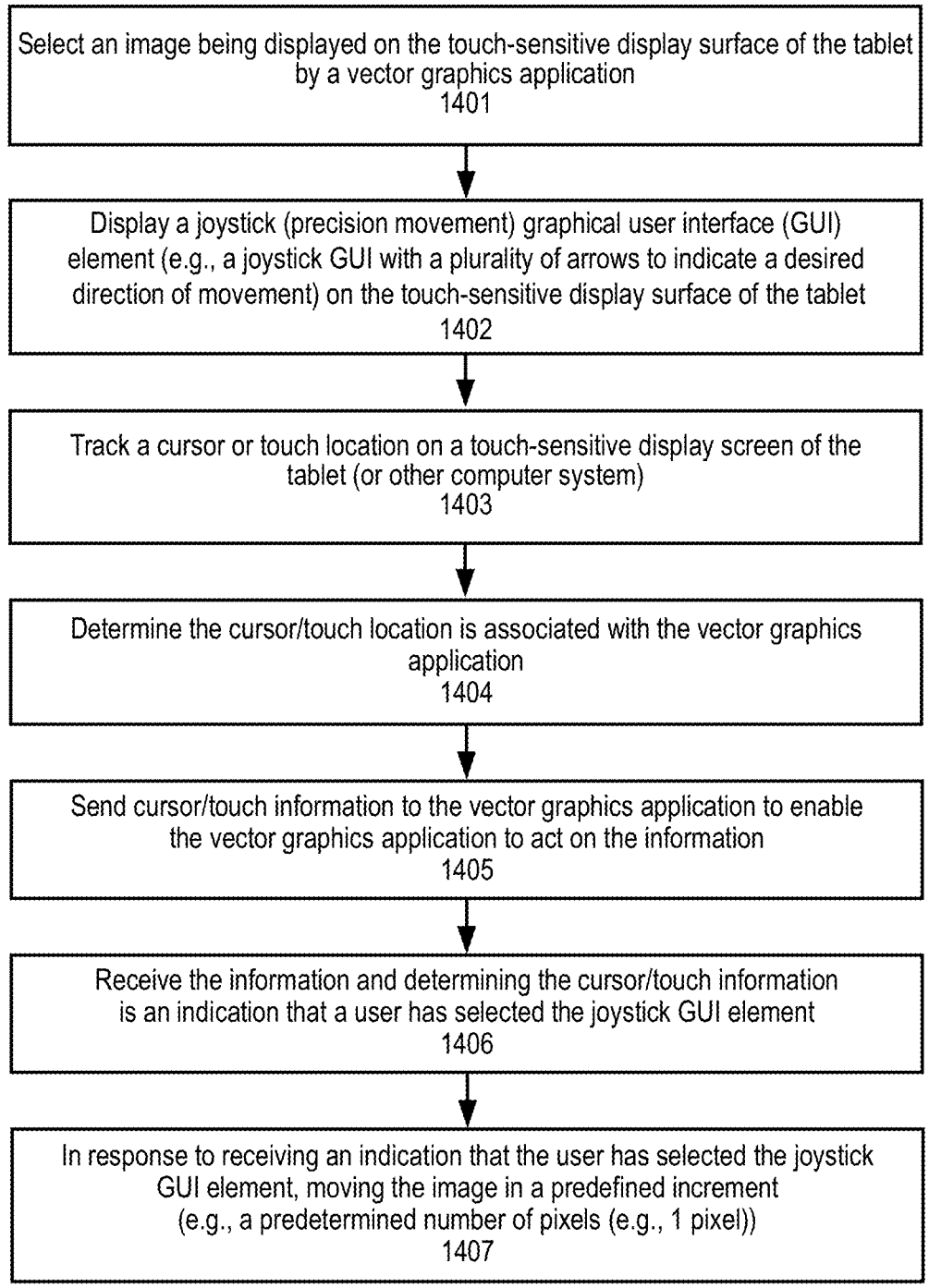
FIG. 14 is a flow diagram of one embodiment of a process for performing precision movements in a vector graphics application.

FIG. 14 illustrates a flow diagram of one embodiment of a process for performing precision movements in a vector graphics application. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program.

Referring to FIG. 14, the process begins with processing logic selecting an image being displayed on the touch sensitive display surface of the tablet by a vector graphics application that is writing on the tablet (processing block 1401). Processing logic also displays a GUI element (e.g., a joystick GUI) on the touch surface display screen of the tablet (processing block 1402). In one embodiment, the GUI element is a joystick GUI with a plurality of arrows to indicate a desired direction of movement for the image in the user interface.

Processing logic tracks a cursor or touch location on the touch surface display screen of the tablet (processing block 1403) and determines the location of the cursor/touch is associated with the vector graphics application (processing block 1404). In one embodiment, determining that the location of the cursor is associated with the vector graphics application is based on the cursor appearing in a window associated with or under control of the vector graphics application. Processing logic sends the cursor/touch location information to the vector graphics application to enable the vector graphics application to act on the information (processing block 1405).

Processing logic receives the cursor/touch location information and determines the cursor/touch location indicates a user has selected the precision movement GUI element that is displayed on the user interface on the touch sensitive display surface (processing block 1406) and in response thereto, moves the image one predefined increment (processing block 1407). In one embodiment, the predefined increment is a predetermined number of pixels. In one embodiment, the predetermined number of pixels is one pixel. Thus, by using the GUI element (e.g., a joystick GUI), the user is able to move the image in pixel increments. This is particularly important as the control of the pin tool or a user's finger on the tablet (or other computer system) is difficult to deal with precision.

Time-Lapse Video from Undo History

In one embodiment, the vector graphics application generates a time-lapse video based on a user's undo history of interaction with the user interface of the vector graphics application. A time-lapse is a term used to refer to a method of filming very slow actions by taking a series of single pictures over a period of time and then putting them together to show the action happening very quickly. It is popularly used to register long term processes like a sunset, city traffic, a flower blooming, and so on. Many of the new smartphones are able to create such time-lapse videos too. In the context of design software, a time-lapse video captures the progress from beginning to the end of the artwork. Time-lapse is a popular feature in digital painting (raster-based drawing) applications.

A problem with generating a time-lapse video is that most vector graphic design software do not offer such a feature. Instead, users rely on screen recording. There are some problems and limitations with screen recordings. Screen recordings usually rely on third party software that will record in real-time everything in the user's display, including, for example, the user cursor, the operating system interface, the actions outside the design software. While some advanced screen recording software allows hiding some of the spoken elements, it will still display all the menus and actions that occur inside the graphic design software, such as, for example, anchor points, zooming, rotating canvas, selection boxes, etc.

Screen recordings can be useful for educational purposes (tutorials) but when the goal is to show and put the creation process in focus the results are sub-optimal due to the "noise" happening around the artwork. Screen recording also demands a previous plan, the user has to start and end the recording session manually. This process can be tiresome for multisession and strongly limits the user when there is not an initial intention of recording an artwork. Screen recording can be very memory and processor-intensive for long recordings. The raw video of a screen recording will be as long as the recorded session and requires post-editing in order to achieve a time-lapse effect. The screen recording is also usually bound to the same screen resolution as the original editing session, which might not be the same as the intended time-lapse exported content resolution.

Thus, there are a number of problems associated with previous techniques to create a time-lapse video.

As discussed above, the vector graphics application generates a time-lapse video from the undo history that captures information as the user interacts with the user interface of the vector graphics application. In one embodiment, a goal of these techniques is to allow the user to export a time-lapse video that will be based on the undo history and that will reconstruct the artwork from beginning to end and will hide all non-artwork relevant elements like, for example, but not limited to, user cursor, UI elements, anchor points, selection boxes, zooming, rotation effects, etc. In other words, in one embodiment, the video will not reflect the real-time passed but the actions taken while creating the artwork.

In one embodiment, all user actions are registered even throughout multiple sessions, and the user will not need to manually start to record and can take the export action at any moment. Before exporting, in one embodiment, the user will be able to change the video resolution and video speed settings. This feature will not induce stress on the processor since the processing will only be done when the time-lapse is exported.

There are a number of benefits associated with one or more of the time-lapse generation embodiments. These include creation of in application multi-session time-lapse videos without UI or other interferences, no need to plan the recording session, no need to post edit the video, a smaller memory usage to achieve the time-lapse effect when compared to video recording.

Thus, the vector graphics application uses the undo history to create the time lapse video. This provides a low-instrumentation way to track the user's editing actions, given undo history is a built-in feature for modern content creation applications (i.e., the implementation overhead/cost is already a necessity anyway).

In one embodiment, the vector graphics application leverages the undo history to playback the user's actions across one or multiple editing sessions, to fully reconstruct the creative process of a user for a given illustration/design (and then export the final time-lapse video). In one embodiment, to support multiple sessions, the vector graphics application is designed and implemented in such a way to make the aforementioned undo history persistent. In one embodiment, to make the undo history persistent, each user action with any element is decomposed into basic parts (e.g., an action signature and action parameters) and then saved inside the undo history. Each element has its unique identifier which is also saved. Then, during time lapse export, the original action is recreated from the saved data, the target object is located using the saved unique identifier and the recreated action is applied to the located element. This allows the vector graphics application to replicate all user actions from start to end through several application sessions. In other words, the undo action is converted into a serializable representation (e.g., an action name plus action arguments). This representation is then saved to disk. This process is in contrast to normal undo history operation where the undo history is main memory bound thus cleared when a given editing session ends.

Figure 15A:
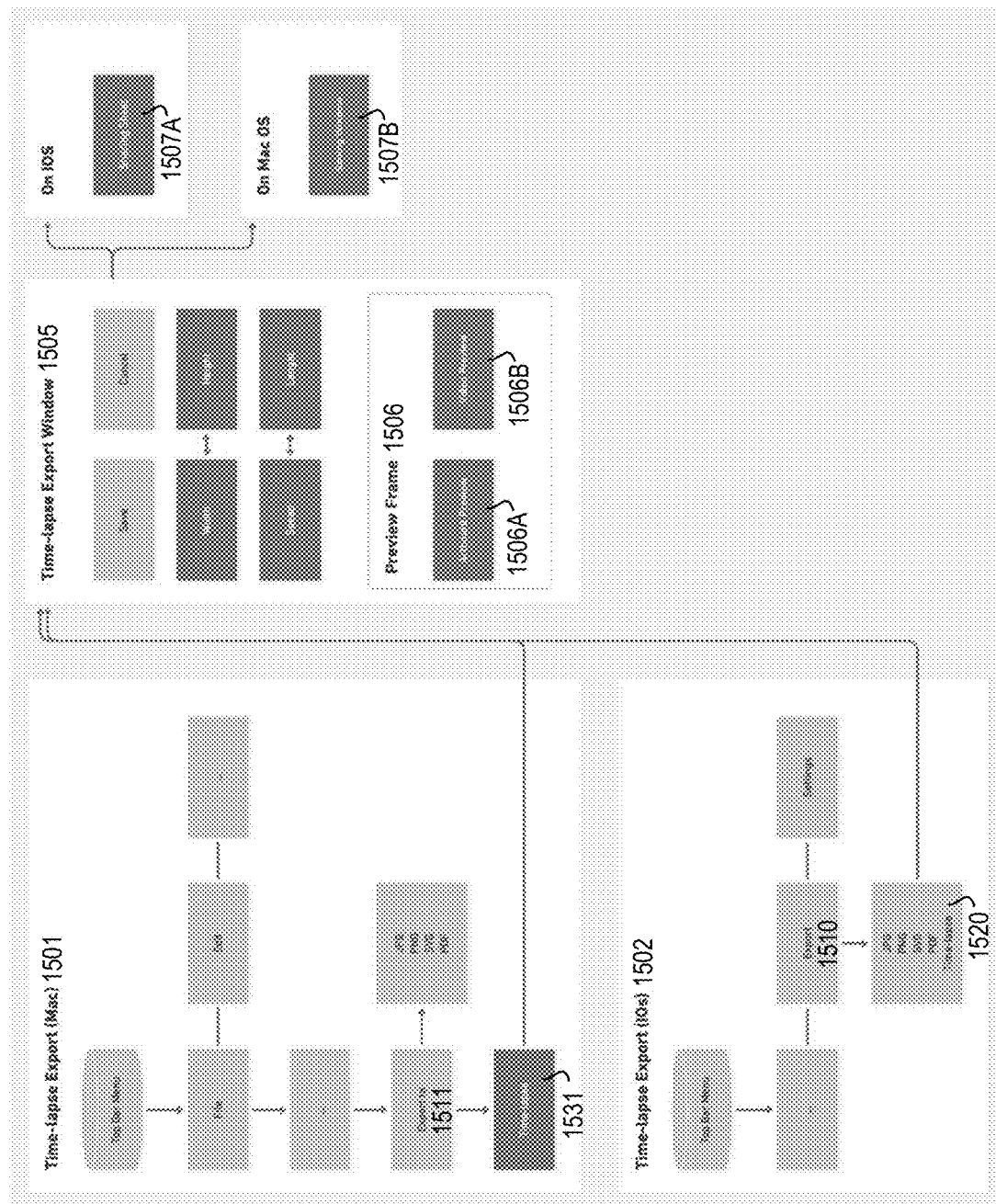
FIG. 15A illustrates one embodiment of the time-lapse architecture of the vector graphics application.

FIG. 15A illustrates one embodiment of the time-lapse architecture of the vector graphics application. Referring to FIG. 15A, the architecture includes time-lapse video generation and export paths for Mac 1501 and IOS 1502.

In one embodiment, the vector graphics application hides or otherwise prevents certain information from appearing in the time-lapse video. In one embodiment, this information that does not appear in the time-lapse video is everything that it is not related to the artwork, such as, for example, but not limited to, the operating system, the cursor, the UI from vector graphics application, including all menus, toolbar, pop ups, guides, rulers. In one embodiment, all the editing related operations, such as, for example, zooming, canvas rotation, selection boxes, outline mode, and anchor points, etc. do not appear in the time-lapse video as well. Thus, in one embodiment, the time-lapse video only contains the exported artboard, and its elements.

Figure 15B:
FIG. 15B illustrates an example of a window displayed in response to selecting the export icon.
Figure 15C:
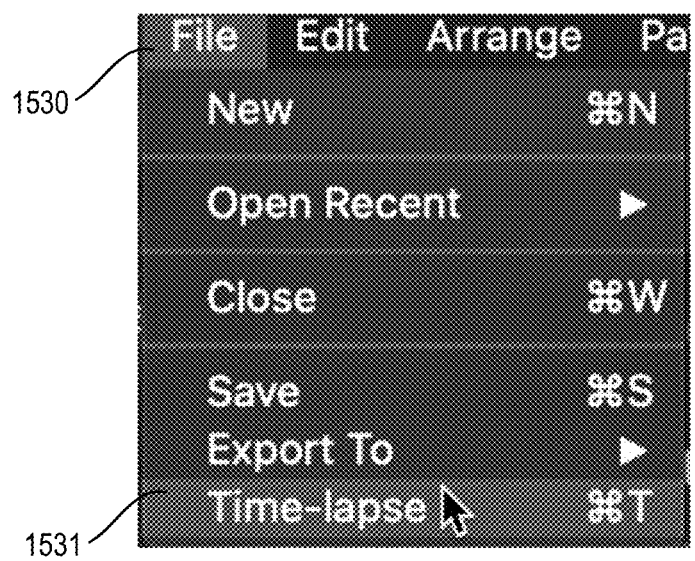
FIG. 15C illustrates an example of a menu bar in which a FILE menu option has been selected and the time lapse export option has been selected from the FILE menu.

In one embodiment, the user is provided access to the time-lapse video in one or more ways. This may be dependent on the operating system (OS) of the tablet or system upon which the vector graphics application is running. In one embodiment, in order to access the export time-lapse window 1505, the user presses an export icon 1510 and then a time-lapse export option 1520 among the file formats that are shown. FIG. 15B illustrates an example of a window displayed in response to selecting the export icon 1510. This may be used for iOS devices. In another embodiment, the user navigates in the menu bar to a FILE option and presses a Time-lapse export option (alternatively uses a command+T shortcut). FIG. 15C illustrates an example of a menu bar in which FILE 1530 has been selected and the time lapse export option 1531 has been selected in response to selecting the export icon 1510. This may be used for macOS devices.

Figure 15D:
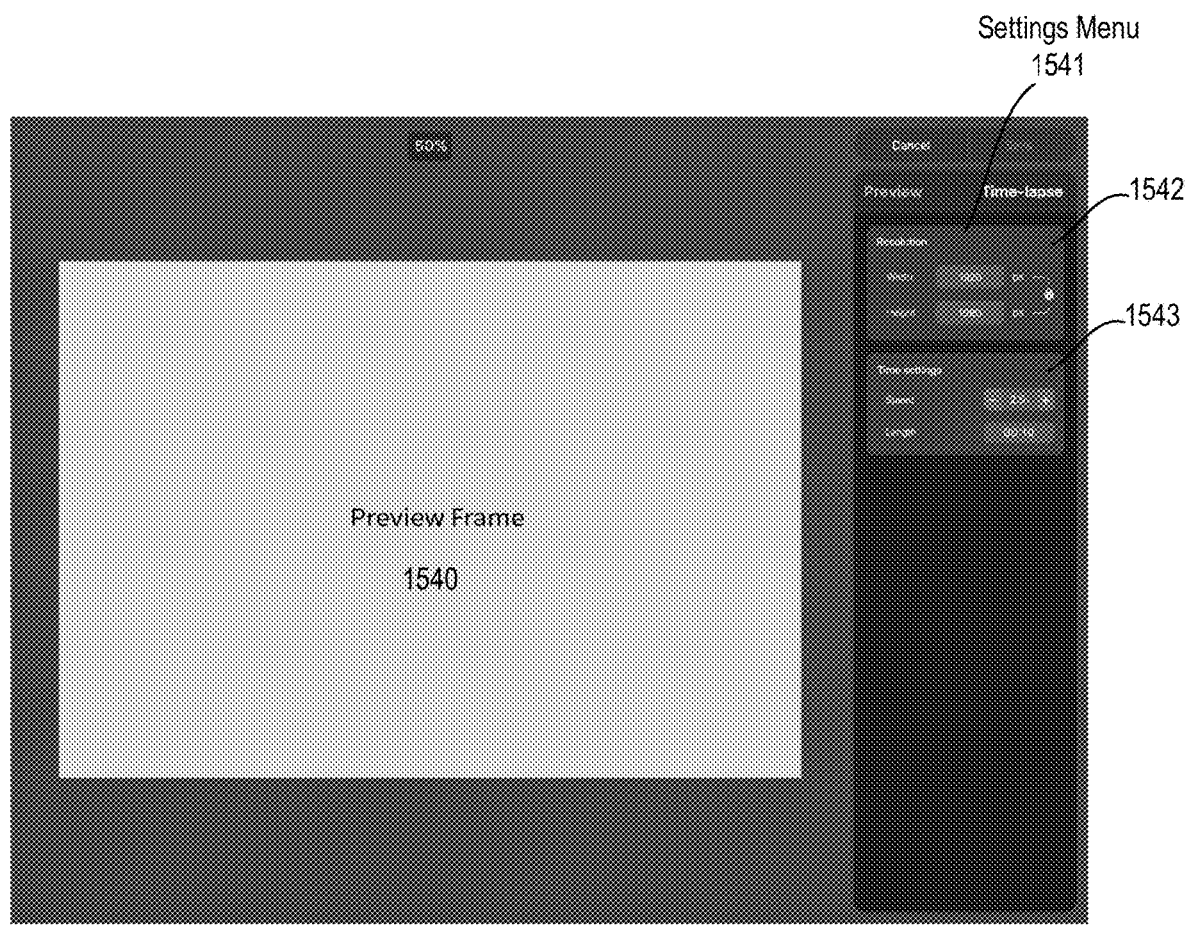
FIG. 15D illustrates an example of a preview frame and a settings menu.

In one embodiment, export window 1505 operates in a similar manner to the export window from other file formats. That is, export window 1505 includes a preview frame 1506 to display a preview from the previously selected artboard as artboard preview 1506A with exporting setting options. FIG. 15D illustrates an example of a preview frame 1540 and settings menu 1541.

Figure 15E:
FIG. 15E illustrates one embodiment of a resolution settings menu
Figure 15F:
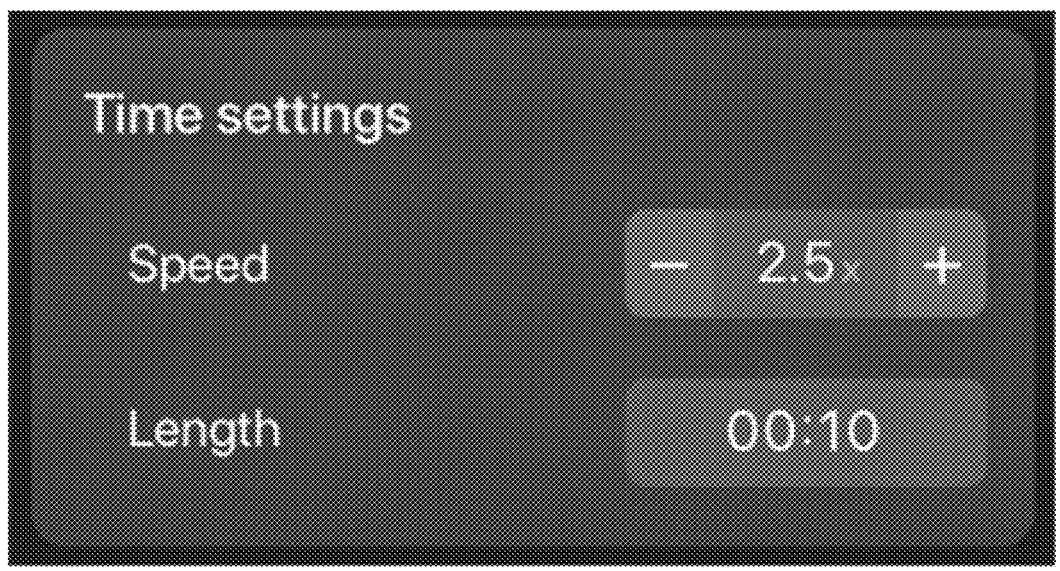
FIG. 15F illustrates one embodiment of a time settings menu

In one embodiment, the settings are divided into two categories, resolution settings 1542 and time settings 1543. FIGS. 15E and 15F illustrate examples of a resolution settings menu and time settings menu respectively.

In one embodiment, for resolution, the vector graphics application allows the user to configure the resolution of the exported video by setting the width and height up to a max of 4 k resolution (e.g., 3840×2160 pixels). In one embodiment, the resolution is set to the artboard dimensions as default. If the document is bigger than 3840×2160 pixels, then the vector graphics application scales the resolution down to the maximum supported resolution. In one embodiment, the values of width and height are by default linked, such that changing one value will affect the other to maintain the same aspect ratio. In one embodiment, if the user desires to stretch or shrink the video, the user can specify that to the vector graphics application by pressing the lock icon.

In one embodiment, for time settings, the vector graphics application also offers two input values, namely speed and length and allows the user to define the final video result by setting the speed or length. In one embodiment, these values are interconnected such that by changing one of the two values, the other it is automatically updated.

The speed setting menu defines the number of actions that will be displayed in each second of the video. In one embodiment, the default value for speed is 2×. In one embodiment, the user can manually input values with the keypad (respecting the minimum and maximum) with up to one decimal number. In one embodiment, the plus and minus buttons in the input field allow a user to increase or decrease the speed value to the standard round values (e.g., 2×, 4×, 8×, 16×, 32×, 64×, etc.). In one embodiment, by manually setting the speed the length value is updated.

The length setting allows the user to directly define the duration of the video. In one embodiment, when the user sets the speed, the vector graphics application displays the estimated length of the video. In one embodiment, the speed will be adapted (respecting the maximum and minimum values) to accommodate this length value. In one embodiment, the default value for the length setting is defined by the default speed of 2×, and this length value will be variable from document to document depending on the number of actions recorded. In one embodiment, the maximum value is variable and limited by the minimum speed of 1×. In one embodiment, the user cannot export videos with less than 1 action per second. In one embodiment, the min value is variable and limited by the maximum speed of 64× but never less than 1 second. In one embodiment, the user can manually input the minutes and seconds on the time picker, and is limited by the maximum and minimum of the speed. In one embodiment, by manually setting the length, the speed value is updated.

In one embodiment, in order to render the time-lapse video, the vector graphics application provides a GUI element. In one embodiment, the GUI element is a save button on the user interface, and when pressed it starts to render the video with the defined setting options. In one embodiment, when the rendering starts a progress loader (from 0% to 100%) appears above the artboard and the UI is "frozen", and the only action the user can take during the rendering is to press a cancel button on the user interface. If the user changes the value from a rendered video, the >save button< will start a new rendering process.

In one embodiment, when the rendering finishes, the video preview takes place from the artboard and automatically starts playing and the following happens. For saving and sharing on iOS, the standard iOS share sheet 1507A opens below the save button and the user can directly share or save the file in the desired place. If the user closes share sheet 1507A and does not change any value, share sheet 1507A will reopen by pressing the save button. For saving and sharing on macOS, the saving window 1507B opens and the user can choose the path to save the document locally. If the user closes saving window 1507B and does not change any value by pressing the save button the save window will reopen.

In one embodiment, the vector graphics application allows re-rendering. If the user, after rendering the video is not satisfied with the result, the user can change and choose new setting values. The rendered video is discarded, and the user has to press save again to re-do the render process with the new settings.

To cancel the time-lapse video generation, in one embodiment, the vector graphics application includes a cancel button. In one embodiment, the cancel button serves two distinct functions of closing the export window and aborting the render process. If pressed while rendering, the vector graphics application will only abort the rendering process without closing the window; otherwise, the vector graphics application will close the export window as in the other file formats.

The preview frame 1506 frame displays by default the selected artboard in 1506A. After rendering, preview frame 1506 gives place to a video player with the rendered video 1506B. In one embodiment, with respect to video player preview, after a video is rendered, the user gets the opportunity to preview the video before saving it. In one embodiment, the video player has the basic iOS player functionalities play, pause, stop, and the timeline, and this player takes the place of the artboard preview, such that if the user changes the setting values after rendering, the video is discarded and the artboard preview returns.

In one embodiment, video background of the time-lapse video is defined by the artboard background setting. If set to transparent, the video background is displayed as transparent. To clarify, MP4 does not support real transparent videos, and thus the displayed background only simulates the transparent background in order to display all elements in the artboard.

In one embodiment, the resultant file format of the rendering process for the time-lapse video is MP4.

In order to be able to generate a time-lapse video, the vector graphics application records every action the user takes inside the document throughout possibly many sessions. These actions will be internally stored in the Undo Manager and will not be accessible to the user through the UI. In one embodiment, the actions are stored in the Undo Manager by storing the instructions executed by the vector graphics application when the user is interacting with the artwork in the user interface of the vector graphics application. To assure a time-lapse complete independently of the history size of the document, there will be no limit on the number of actions stored.

In one embodiment, the Undo Manager adds new functionalities beyond the possibility of creating time-lapses. For example, in one embodiment, the vector graphics application saves a document history with the document, and will also have an unlimited multi-session UNDO actions.

Figure 16:
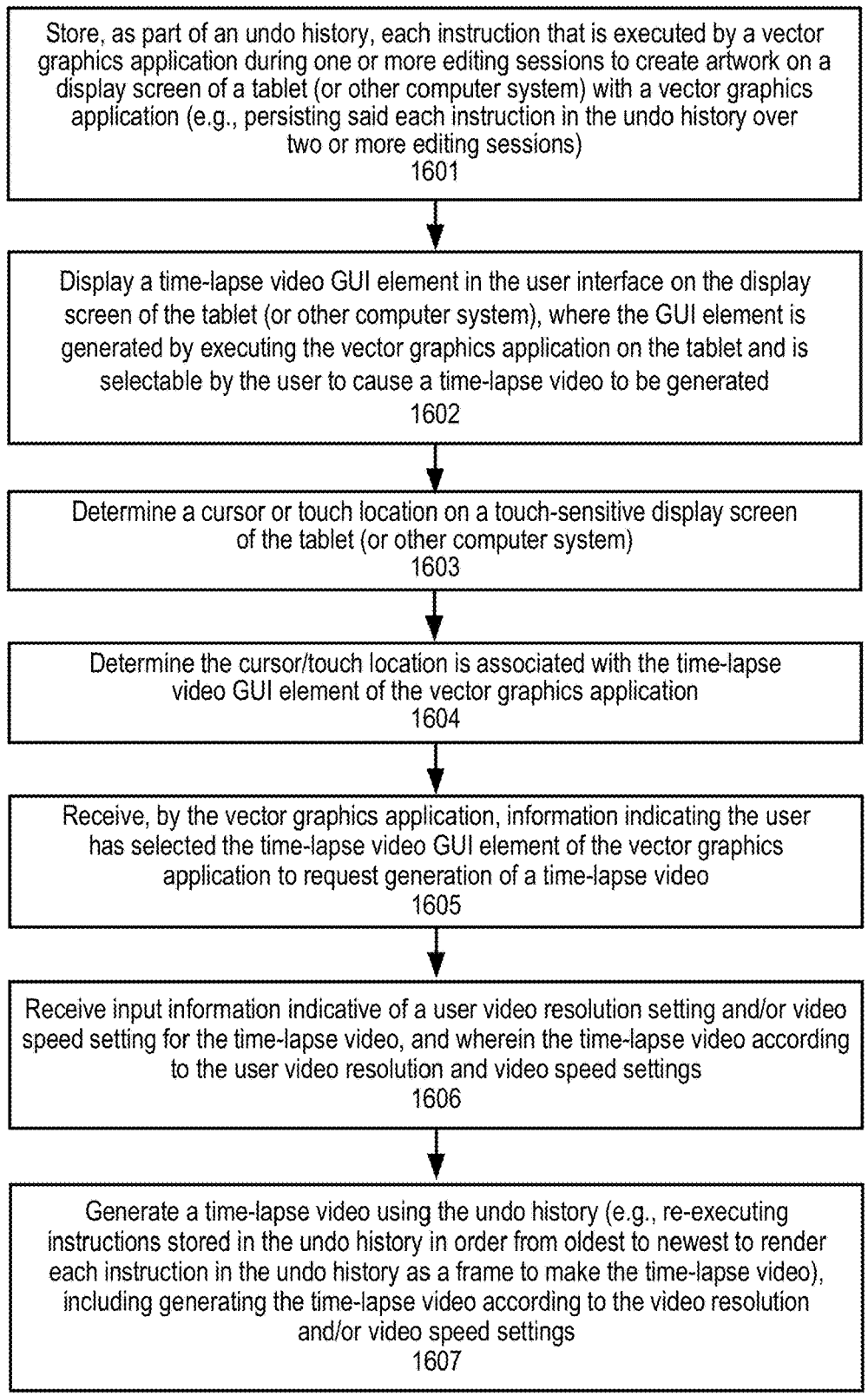
FIG. 16 is a flow diagram of one embodiment of a process for creating a time-lapse video.

FIG. 16 is a flow diagram of one embodiment of a process for creating a time-lapse video. The process is performed by processing logic that may comprise hardware (circuitry, dedicated logic, etc.), software (such as is run on a general-purpose computer system or a dedicated machine), firmware or a combination of the three. In one embodiment, the process is performed on a tablet running a vector graphics application program.

Referring to FIG. 16, the process begins by storing, as part of an undue history, each instruction that is executed by a vector graphics application to create artwork on a display screen of a tablet (or other computer system) executing the vector graphics application (processing block 1601). The instructions are executed by the vector graphics application during one or more editing sessions. In one embodiment, storing the instructions executed by the vector graphics application program during one or more editing sessions comprises persisting each instruction in the undo history over two or more editing sessions.

Processing logic displays the time-lapse video GUI element in the user interface on the display screen of the tablet where the time-lapse video GUI element is generated by executing the vector graphics application during one or more editing sessions on the tablet and is selectable by user to cause a time-lapse video to be generated (processing block 1602).

Thereafter, while the user is utilizing the vector graphics application program, processing logic determines that a cursor or touch location on the touch surface display screen of the tablet has occurred (processing block 103) and determines that the cursor/touch location associated with the time-lapse video GUI element (processing block 1604).

Processing logic receives the information indicating the user has selected the time-lapse GUI element to request generation of the time-lapse video (processing block 1605). IN one embodiment, processing logic also receives the input information indicative of a user video resolution setting and/or video speed setting for the time-lapse video (processing block 1606). In one embodiment, this is optional.

In response to the inputs, processing logic generates the time-lapse video using the undo history, including generating the time-lapse video according to any video resolution and/or video speed settings that have been received (processing block 1607). In one embodiment, generating the time-lapse video using the undo history comprises re-executing the instructions stored in the undue history in order from oldest to newest to render each instruction in the undo history as a frame that is included in the time-lapse video.

The time-lapse video reconstructs the artwork without non-artwork related graphical items that appears on the display with the artwork was created prior to generating the time-lapse video.

An Example Computer System

Figure 17:
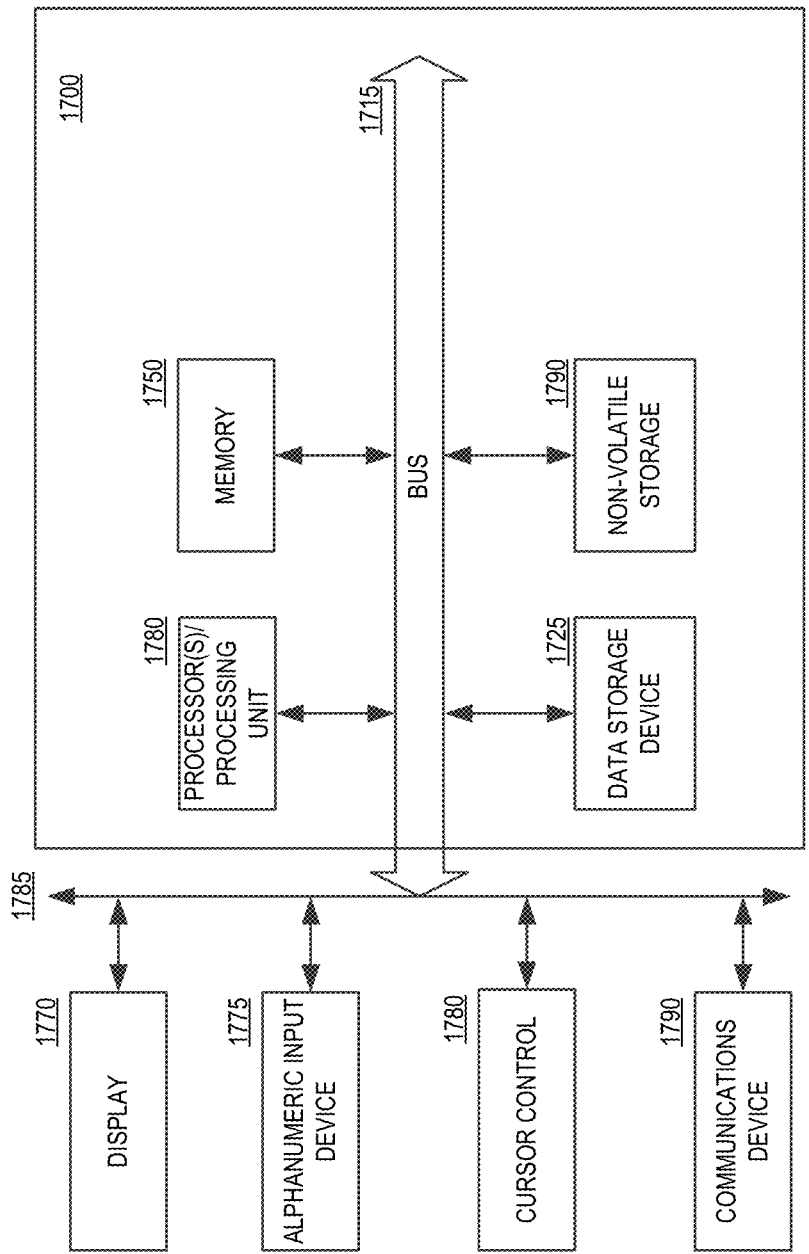
FIG. 17 is one embodiment of a computer system that may be used to support the systems and operations discussed herein

FIG. 17 is one embodiment of a computer system that may be used to support the systems and operations discussed herein. In one embodiment, the computer system comprises a tablet or other portable computer system. It will be apparent to those of ordinary skill in the art, however, that other alternative systems of various system architectures may also be used.

The data processing system illustrated in FIG. 17 includes a bus or other internal communication means 1715 for communicating information, and a processor(s) 1710 coupled to the bus 1715 for processing information. The system further comprises a random-access memory (RAM) or other volatile storage device 1750 (referred to as memory), coupled to bus 1715 for storing information and instructions to be executed by processor 1710. Main memory 1750 also may be used for storing temporary variables or other intermediate information during execution of instructions by processor(s) 1710. The system also comprises a read only memory (ROM) and/or static storage device 1720 coupled to bus 1715 for storing static information and instructions for processor 1710, and a data storage device 1725 such as a magnetic disk or optical disk and its corresponding disk drive. Data storage device 1725 is coupled to bus 1715 for storing information and instructions.

The system may further be coupled to a display device 1770, such as a touch surface display, a light emitting diode (LED) display or a liquid crystal display (LCD) coupled to bus 1715 through bus 1765 for displaying information to a computer user. An alphanumeric input device 1775, including alphanumeric and other keys, may also be coupled to bus 1715 through bus 1765 for communicating information and command selections to processor 1710. An additional user input device is cursor control device 1780, such as a touchpad, mouse, a trackball, stylus, or cursor direction keys coupled to bus 1715 through bus 1765 for communicating direction information and command selections to processor 1710, and for controlling cursor movement on display device 1770.

Another device, which may optionally be coupled to computer system 1700, is a communication device 1790 for accessing other nodes of a distributed system via a network. The communication device 1790 may include any of a number of commercially available networking peripheral devices such as those used for coupling to an Ethernet, token ring, Internet, or wide area network. The communication device 1790 may further be a null-modem connection, or any other mechanism that provides connectivity between the computer system 1700 and the outside world. Note that any or all of the components of this system illustrated in FIG. 17 and associated hardware may be used in various embodiments as discussed herein.

In one embodiment, processor(s) 1710 executes instructions to perform any of the operations described above including the components and modules described in relation to FIG. 2 as well as the functions related to displaying and performing operations related to the user interface including, but not limited to, rulers and guides, hover mode, last node maker, long press for help, auto trace, high precision joystick movement, and time-lapse video.

It will be appreciated by those of ordinary skill in the art that any configuration of the system may be used for various purposes according to the particular implementation. The control logic or software implementing the described embodiments can be stored in main memory 1750, mass storage device 1725, or other storage medium locally or remotely accessible to processor 1710.

It will be apparent to those of ordinary skill in the art that the system, method, and process described herein can be implemented as software stored in main memory 1750 or read only memory 1720 and executed by processor 1710. This control logic or software may also be resident on an article of manufacture comprising a computer readable medium having computer readable program code embodied therein and being readable by the mass storage device 1725 and for causing the processor 1710 to operate in accordance with the methods and teachings herein.

The embodiments discussed herein may also be embodied in a handheld or portable device containing a subset of the computer hardware components described above. For example, the handheld device may be configured to contain only the bus 1785, the processor 1710, and memory 1750 and/or 1725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 1710, a data storage device 1725, a bus 1715, and memory 1750, and only rudimentary communications mechanisms, such as a small touchscreen that permits the user to communicate in a basic manner with the device. In general, the more special-purpose the device is, the fewer of the elements need to be present for the device to function.

There are a number of example embodiments described herein.

Example 1 is a method comprising: storing each instruction that is executed by a vector graphics application to create artwork on a display of a computer system during one or more editing sessions as part of an undo history; and generating a time-lapse video using the undo history.

Example 2 is the method of example 1 that may optionally include that generating a time-lapse video comprises re-executing instructions stored in the undo history in order from oldest to newest.

Example 3 is the method of example 1 that may optionally include that generating a time-lapse video comprises rendering results of executing each instruction in the undo history as a frame to make the time-lapse video.

Example 4 is the method of example 3 that may optionally include persisting said each instruction in the undo history over two or more editing sessions.

Example 5 is the method of example 1 that may optionally include generating a time-lapse video occurs in response to selection of a single graphical user interface (GUI) element of a GUI of the vector graphics application.

Example 6 is the method of example 1 that may optionally include receiving input information indicative of a user video resolution setting and/or video speed setting for the time-lapse video, and wherein the time-lapse video according to the user video resolution and video speed settings.

Example 7 is the method of example 1 that may optionally include storing each instruction that is executed by a vector graphics application to create artwork comprises recording all actions performed in a document of the artwork.

Example 8 is the method of example 1 that may optionally include that the time-lapse video reconstructs the artwork without non-artwork related graphical items that appears on the display with the artwork was created prior to generating the time-lapse video.

Example 9 is a system comprising: a touch-sensitive display surface; a memory; and one or more processors coupled to the memory and the touch-sensitive display surface, the one or more processors to: store each instruction that is executed by a vector graphics application to create artwork on a display of a computer system during one or more editing sessions as part of an undo history, and generate a time-lapse video using the undo history.

Example 10 is the system of example 9 that may optionally include that generating a time-lapse video comprises re-executing instructions stored in the undo history in order from oldest to newest.

Example 11 is the system of example 9 that may optionally include that generating a time-lapse video comprises rendering results of executing each instruction in the undo history as a frame to make the time-lapse video.

Example 12 is the system of example 11 that may optionally include persisting said each instruction in the undo history over two or more editing sessions.

Example 13 is the system of example 9 that may optionally include that generating a time-lapse video occurs in response to selection of a single graphical user interface (GUI) element of a GUI of the vector graphics application.

Example 14 is the system of example 9 that may optionally include receiving input information indicative of a user video resolution setting and/or video speed setting for the time-lapse video, and wherein the time-lapse video according to the user video resolution and video speed settings.

Example 15 is the system of example 9 that may optionally include that storing each instruction that is executed by a vector graphics application to create artwork comprises recording all actions performed in a document of the artwork.

Example 16 is the system of example 9 that may optionally include that the time-lapse video reconstructs the artwork without non-artwork related graphical items that appears on the display with the artwork was created prior to generating the time-lapse video.

Example 17 is one or more non-transitory computer readable storage media having instructions stored thereupon which, when executed by a system having at least a processor and a memory therein, cause the system to perform operations comprising: storing each instruction that is executed by a vector graphics application to create artwork on a display of a computer system during one or more editing sessions as part of an undo history; and generating a time-lapse video using the undo history.

Example 18 is the system of example 17 that may optionally include that generating a time-lapse video comprises re-executing instructions stored in the undo history in order from oldest to newest.

Example 19 is the system of example 17 that may optionally include that generating a time-lapse video comprises rendering results of executing each instruction in the undo history as a frame to make the time-lapse video.

Example 20 is the system of example 17 that may optionally include that the method further comprises persisting said each instruction in the undo history over two or more editing sessions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    storing, as part of an undo history, each instruction that is (i) executed by a vector graphics application to create artwork on a display of a computer system during one or more editing sessions and (ii) is able to be undone, wherein each instruction is stored as a serializable representation of a respective user action taken by a user when creating the artwork; and
    generating a time-lapse video using the undo history, wherein generating the time-lapse video comprises:
        performing an exporting process comprising:
            accessing the undo history to obtain instructions that were executed by the vector graphics application to create the artwork;
            accessing user customized setting selections to determine (i) specific background features of the graphical user interface (GUI) that are to be included in the time-lapse video and (ii) a length of time of the time-lapse video;
            re-executing each instruction according to its serializable representation to generate the time-lapse video such that the time-lapse video, when played, visualizes a re-creation of the artwork without displaying graphical user interface (GUI) elements of the vector graphics application that appeared on the display while the instructions were originally executed, except for any specific background features selected to be included in the time-lapse video, wherein the re-creation of the artwork is based exclusively on the undo history, such that user actions which are unable to be undone are not displayed due to not being part of the undo history, and wherein the speed of the time-lapse video is dependent on a specified length of time of the time-lapse video; and
            providing a preview of the time-lapse video to the user and allowing the user the select whether to (i) discard the time-lapse video and generate a new one with new customized settings, or (ii) to save it.

2. The method of claim 1 wherein generating the time-lapse video comprises re-executing instructions stored in the undo history in order from oldest to newest.

3. The method of claim 1 wherein generating the time-lapse video comprises rendering results of re-executing each instruction in the undo history as a frame to make the time-lapse video.

4. The method of claim 3 further comprising persisting said each instruction in the undo history over two or more editing sessions.

5. The method of claim 1 wherein generating the time-lapse video occurs in response to selection of a single graphical user interface (GUI) element of a GUI of the vector graphics application.

6. The method of claim 1 further comprising receiving input information indicative of a user video resolution setting and video speed setting for the time-lapse video, and wherein the time-lapse video is generated according to the user video resolution setting and video speed setting.

7. The method of claim 1 wherein storing each instruction that is executed by the vector graphics application to create the artwork comprises recording all actions performed in a document of the artwork.

8. A system comprising:
a touch-sensitive display surface;
a memory; and
one or more processors coupled to the memory and the touch-sensitive display surface, the one or more processors to:
store, as part of an undo history, each instruction that is (i) executed by a vector graphics application to create artwork on a display of a computer system during one or more editing sessions and (ii) is able to be undone, wherein each instruction is stored as a serializable representation of a respective user action taken by a user when creating the artwork; and
generate a time-lapse video using the undo history, wherein generating the time-lapse video comprises:
performing an exporting process comprising:
accessing the undo history to obtain instructions that were executed by the vector graphics application to create the artwork;
accessing user customized setting selections to determine (i) specific background features of the graphical user interface (GUI) that are to be included in the time-lapse video and (ii) a length of time of the time-lapse video;
re-executing each instruction according to its serializable representation to generate the time-lapse video such that the time-lapse video, when played, visualizes a re-creation of the artwork without displaying graphical user interface (GUI) elements of the vector graphics application that appeared on the display while the instructions were originally executed, except for any specific background features selected to be included in the time-lapse video, wherein the re-creation of the artwork is based exclusively on the undo history, such that user actions which are unable to be undone are not displayed due to not being part of the undo history, and wherein the speed of the time-lapse video is dependent on a specified length of time of the time-lapse video; and
providing a preview of the time-lapse video to the user and allowing the user the select whether to (i) discard the time-lapse video and generate a new one with new customized settings, or (ii) to save it.

9. The system of claim 8 wherein generating the time-lapse video comprises re-executing instructions stored in the undo history in order from oldest to newest.

10. The system of claim 8 wherein generating the time-lapse video comprises rendering results of re-executing each instruction in the undo history as a frame to make the time-lapse video.

11. The system of claim 10 further comprising persisting said each instruction in the undo history over two or more editing sessions.

12. The system of claim 8 wherein generating the time-lapse video occurs in response to selection of a single graphical user interface (GUI) element of a GUI of the vector graphics application.

13. The system of claim 8 further comprising receiving input information indicative of a user video resolution setting and video speed setting for the time-lapse video, and wherein the time-lapse video is generated according to the user video resolution setting and video speed setting.

14. The system of claim 8 wherein storing each instruction that is executed by the vector graphics application to create the artwork comprises recording all actions performed in a document of the artwork.

15. One or more non-transitory computer readable storage media having instructions stored thereupon which, when executed by a system having at least a processor and a memory therein, cause the system to perform operations comprising:
storing, as part of an undo history, each instruction that is (i) executed by a vector graphics application to create artwork on a display of a computer system during one or more editing sessions and (ii) is able to be undone, wherein each instruction is stored as a serializable representation of a respective user action taken by a user when creating the artwork; and
generating a time-lapse video using the undo history, wherein generating the time-lapse video comprises:
performing an exporting process comprising:
accessing the undo history to obtain instructions that were executed by the vector graphics application to create the artwork;
accessing user customized setting selections to determine (i) specific background features of the graphical user interface (GUI) that are to be included in the time-lapse video and (ii) a length of time of the time-lapse video;
re-executing each instruction according to its serializable representation to generate the time-lapse video such that the time-lapse video, when played, visualizes a re-creation of the artwork without displaying graphical user interface (GUI) elements of the vector graphics application that appeared on the display while the instructions were originally executed, except for any specific background features selected to be included in the time-lapse video, wherein the re-creation of the artwork is based exclusively on the undo history, such that user actions which are unable to be undone are not displayed due to not being part of the undo history, and wherein the speed of the time-lapse video is dependent on a specified length of time of the time-lapse video; and
providing a preview of the time-lapse video to the user and allowing the user the select whether to (i) discard the time-lapse video and generate a new one with new customized settings, or (ii) to save it.

16. The one or more non-transitory computer readable storage media of claim 15 wherein generating the time-lapse video comprises re-executing instructions stored in the undo history in order from oldest to newest.

17. The one or more non-transitory computer readable storage media of claim 15 wherein generating the time-lapse video comprises rendering results of re-executing each instruction in the undo history as a frame to make the time-lapse video.

18. The one or more non-transitory computer readable storage media of claim 15 wherein the method further comprises persisting said each instruction in the undo history over two or more editing sessions.

19. The method of claim 1, wherein the GUI elements include one or more of: menus, toolbars, pop ups, guides, rulers, and cursors.

20. The method of claim 1, further comprising exporting the time-lapse video as a video file.

* * * * *